(12) United States Patent
Shibayama et al.

(10) Patent No.: US 9,864,260 B2
(45) Date of Patent: Jan. 9, 2018

(54) IMAGE DISPLAY APPARATUS AND IMAGE DISPLAY UNIT

(71) Applicants: Yasuyuki Shibayama, Kanagawa (JP); Hibiki Tatsuno, Kanagawa (JP); Yohei Takano, Iwate (JP)

(72) Inventors: Yasuyuki Shibayama, Kanagawa (JP); Hibiki Tatsuno, Kanagawa (JP); Yohei Takano, Iwate (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/228,577

(22) Filed: Aug. 4, 2016

(65) Prior Publication Data

US 2017/0064268 A1 Mar. 2, 2017

(30) Foreign Application Priority Data

Aug. 26, 2015 (JP) .................................. 2015-167262

(51) Int. Cl.
*G03B 21/14* (2006.01)
*G02B 7/02* (2006.01)
(Continued)

(52) U.S. Cl.
CPC ........... *G03B 21/142* (2013.01); *G02B 7/023* (2013.01); *G03B 21/2066* (2013.01);
(Continued)

(58) Field of Classification Search
CPC .... G03B 21/28; G03B 21/142; G03B 21/145; G02B 27/18; G02B 27/62; G02B 27/0994
See application file for complete search history.

(56) References Cited

U.S. PATENT DOCUMENTS

2005/0105061 A1\* 5/2005 DeLong ............... H04N 5/7458 353/99
2006/0044795 A1 3/2006 Tatsuno
(Continued)

FOREIGN PATENT DOCUMENTS

| JP | 11-282099 | 10/1999 |
|---|---|---|
| JP | 2000-098272 | 4/2000 |

(Continued)

OTHER PUBLICATIONS

U.S. Appl. No. 15/132,704, filed Apr. 19, 2016.

*Primary Examiner* — Sultan Chowdhury
(74) *Attorney, Agent, or Firm* — Oblon, McClelland, Maier & Neustadt, L.L.P.

(57) ABSTRACT

An image display apparatus and an image display unit. The image display apparatus and the image display unit includes a light source configured to emit light, an illumination optical system including a luminous body forming device configured to form a secondary luminous body, the illumination optical system guiding the light emitted from the light source, an optical modulation element including a plurality of reflection planes to modulate the light guided by the illumination optical system, and a projection optical system including a projection lens system and a barrel storing the projection lens system, the projection optical system projecting the light modulated by the optical modulation element onto a projection plane. The barrel satisfies an equation $\varphi < 0.71H + 8.5$, where $\varphi$ denotes an outside diameter of a front end of the barrel on a light entering side and H denotes distance between the reflection planes and the front end of the barrel.

10 Claims, 20 Drawing Sheets

(51) Int. Cl.
  *G03B 21/28* (2006.01)
  *G03B 21/20* (2006.01)
  *H04N 9/31* (2006.01)
  *G03B 21/00* (2006.01)

(52) U.S. Cl.
  CPC ........... *G03B 21/28* (2013.01); *H04N 9/3114* (2013.01); *G03B 21/008* (2013.01); *G03B 21/208* (2013.01)

(56) References Cited

U.S. PATENT DOCUMENTS

| | | | |
|---|---|---|---|
| 2006/0072074 A1* | 4/2006 | Matsui | H04N 5/7416 353/20 |
| 2007/0139623 A1* | 6/2007 | Hisada | G02B 13/16 353/78 |
| 2007/0279602 A1* | 12/2007 | Sato | G02B 13/16 353/101 |
| 2012/0154768 A1 | 6/2012 | Tatsuno | |
| 2012/0162753 A1 | 6/2012 | Tatsuno | |
| 2013/0044294 A1 | 2/2013 | Shibayama et al. | |
| 2013/0070217 A1 | 3/2013 | Tatsuno | |
| 2013/0107166 A1 | 5/2013 | Osaka et al. | |
| 2013/0107232 A1 | 5/2013 | Tatsuno | |
| 2013/0107233 A1 | 5/2013 | Hirakawa et al. | |
| 2013/0107234 A1 | 5/2013 | Nishina et al. | |
| 2013/0114053 A1 | 5/2013 | Tatsuno et al. | |
| 2013/0235356 A1 | 9/2013 | Takahashi et al. | |
| 2014/0118818 A1 | 5/2014 | Nishina et al. | |
| 2014/0126045 A1 | 5/2014 | Tatsuno et al. | |
| 2014/0146295 A1 | 5/2014 | Tatsuno | |
| 2014/0185145 A1 | 7/2014 | Takano et al. | |
| 2014/0218699 A1 | 8/2014 | Tatsuno | |
| 2014/0268073 A1 | 9/2014 | Takano | |
| 2014/0340658 A1 | 11/2014 | Takano et al. | |
| 2015/0029474 A1 | 1/2015 | Tatsuno | |
| 2015/0062696 A1 | 3/2015 | Tatsuno et al. | |
| 2015/0077725 A1 | 3/2015 | Shibayama | |
| 2015/0138518 A1 | 5/2015 | Tatsuno | |
| 2015/0138625 A1 | 5/2015 | Tatsuno | |
| 2015/0234158 A1 | 8/2015 | Tatsuno et al. | |
| 2015/0370048 A1 | 12/2015 | Takano | |
| 2016/0077420 A1 | 3/2016 | Tatsuno | |
| 2016/0091700 A1 | 3/2016 | Takano | |
| 2016/0103304 A1 | 4/2016 | Takano et al. | |

FOREIGN PATENT DOCUMENTS

| | | |
|---|---|---|
| JP | 2008-107801 | 5/2008 |
| JP | 2011-242606 | 12/2011 |
| JP | 2013-097123 | 5/2013 |
| JP | 2014-139597 | 7/2014 |

* cited by examiner

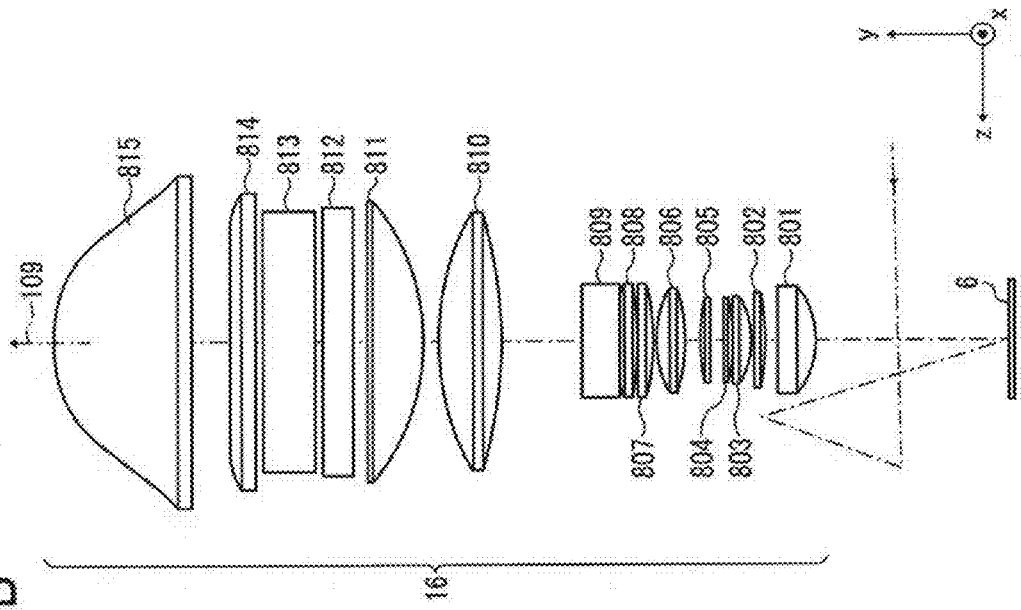
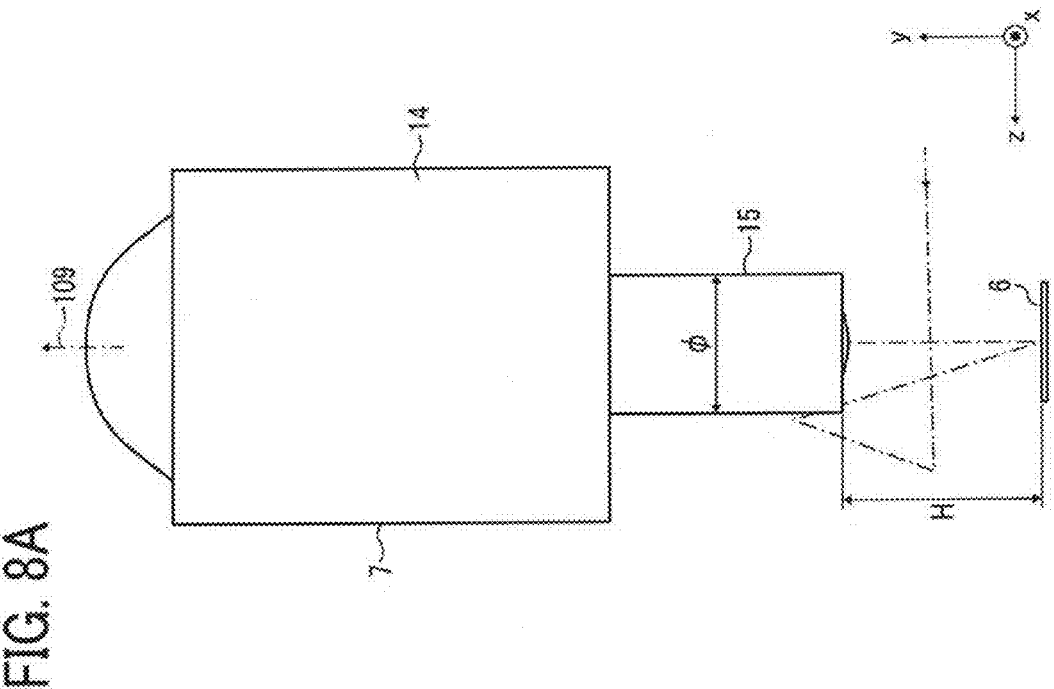

IMAGE DISPLAY APPARATUS AND IMAGE DISPLAY UNIT

CROSS-REFERENCE TO RELATED APPLICATION

This patent application is based on and claims priority pursuant to 35 U.S.C. §119(a) to Japanese Patent Application No. 2015-167262, filed on Aug. 26, 2015, in the Japan Patent Office, the entire disclosure of which is hereby incorporated by reference herein.

BACKGROUND

Technical Field

Embodiments of the present invention relate to an image display apparatus and an image display unit.

Background Art

Image display apparatuses such as a front-projecting projector that projects an image ahead of the projector are widely used for making a presentation at companies or teaching at schools, or as a household electrical appliance.

Image display apparatuses are known for which a digital micromirror device (DMD) is provided as an optical modulation element that modulates the light emitted from a light source. Among these image display apparatuses, there is an increasing demand for so-called front-projecting projectors with very short projection distance. Such ultra-short throw projectors can display a magnified image at very short distance. Moreover, some ultra-short throw projectors include a projection optical system that includes a projection lens system and a reflection optical system provided with concave mirrors.

SUMMARY

Embodiments of the present invention described herein provide an image display apparatus and an image display unit. The image display apparatus and the image display unit includes a light source configured to emit light, the light source including a primary luminous body, an illumination optical system including a luminous body forming device configured to form a secondary luminous body, the illumination optical system guiding the light emitted from the light source, an optical modulation element including a plurality of reflection planes to modulate the light guided by the illumination optical system, and a projection optical system including a projection lens system and a barrel storing the projection lens system, the projection optical system projecting the light modulated by the optical modulation element onto a projection plane. The barrel satisfies an equation $\varphi < 0.71\,H + 8.5$, where $\varphi$ denotes an outside diameter of a front end of the barrel on a light entering side and H denotes distance between the reflection planes and the front end of the barrel.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 8A is a side view of a projection lens system of the image display apparatus of FIG. 1.

FIG. 8B is a diagram illustrating the optical arrangement of the projection lens system of FIG. 8A.

Figure 1:
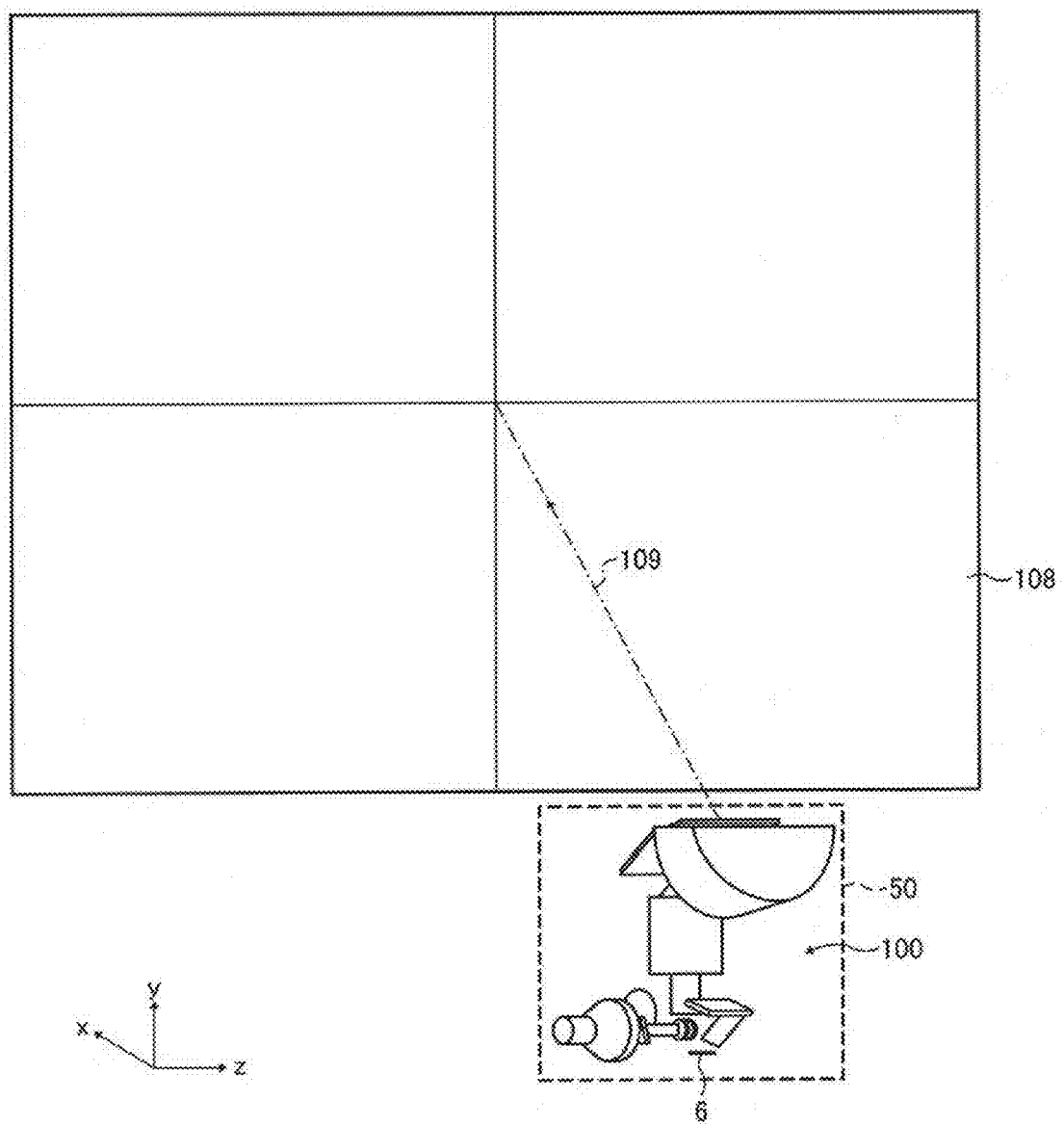
FIG. 1 is a diagram illustrating the optical arrangement of an image display apparatus with respect to a projection plane, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

<Image Display Apparatus>

An image display apparatus and image display unit according to an embodiment of the present invention are described below with reference to the drawings.

<Schematic Configuration of Image Display Apparatus>

FIG. 1 is a diagram illustrating the optical arrangement of an image display apparatus 50 and a projection plane 108, according to the present embodiment. As illustrated in FIG. 1, an image display apparatus 50 according to the present embodiment includes an optical system 100 that serves as an image display unit. The optical system 100 generates an image to be projected, and projects the generated image onto a projection plane 108. As the projection plane 108, for example, a screen is used.

In the following description, the origin point O of an absolute coordinate system (xyz system) is the center point of a plurality of reflection planes that together configure a digital micromirror device (DMD) 6. The DMD 6 serves as an optical modulation element. In the following description, the long side and short side directions on the reflection plane of the DMD 6 are referred to as a Z-axis and an X-axis, respectively. Moreover, the direction orthogonal to both the X-axis and Z-axis is referred to as a Y-axis (see FIG. 6). The Y-axis is in the direction of the normal to the reflection plane of the DMD 6.

In the following description, the angles of rotation around the X-axis, Y-axis, and the Z-axis are referred to as angles of rotation α, β, and γ, respectively. The counterclockwise directions of the rotation α and β when viewed from the +X-axis direction and the +Y-axis direction are the forward direction. The clockwise direction of the rotation γ when viewed from the +Z-axis direction is the forward direction.

Figure 2:
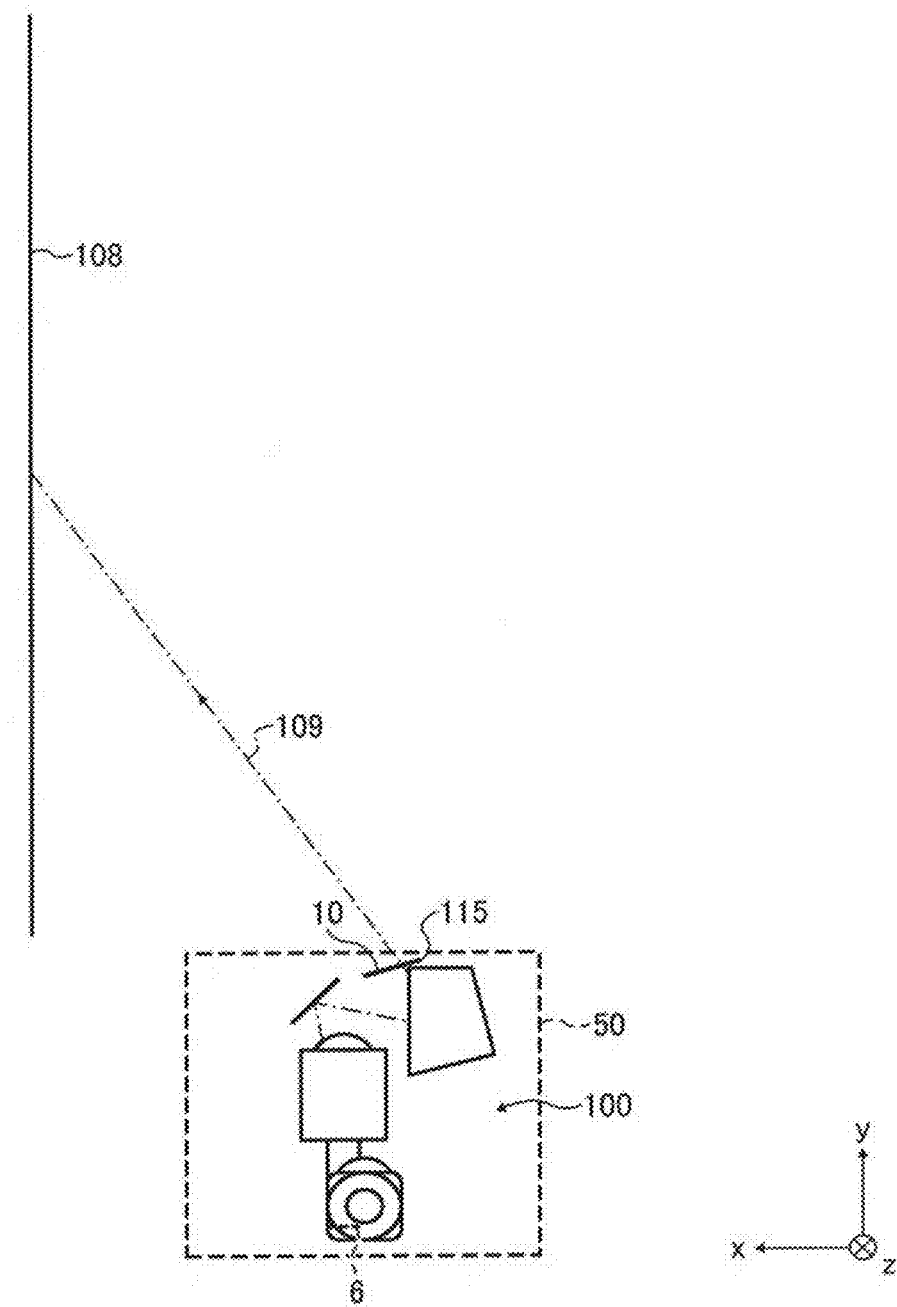
FIG. 2 is a diagram illustrating the optical arrangement of the image display apparatus and the projection plane of FIG. 1 when viewed from the −Z-axis direction.

FIG. 2 illustrates the optical system 100 when viewed from the −Z-axis direction, according to the present embodiment. As illustrated in FIG. 2, the projection plane 108 is parallel to the YZ-plane and is approximately perpendicular to the reflection plane of the DMD 6.

<Configuration of Optical System of Image Display Apparatus>

Next, the configuration of the optical system 100 of the image display apparatus 50 is described.

Figure 3:
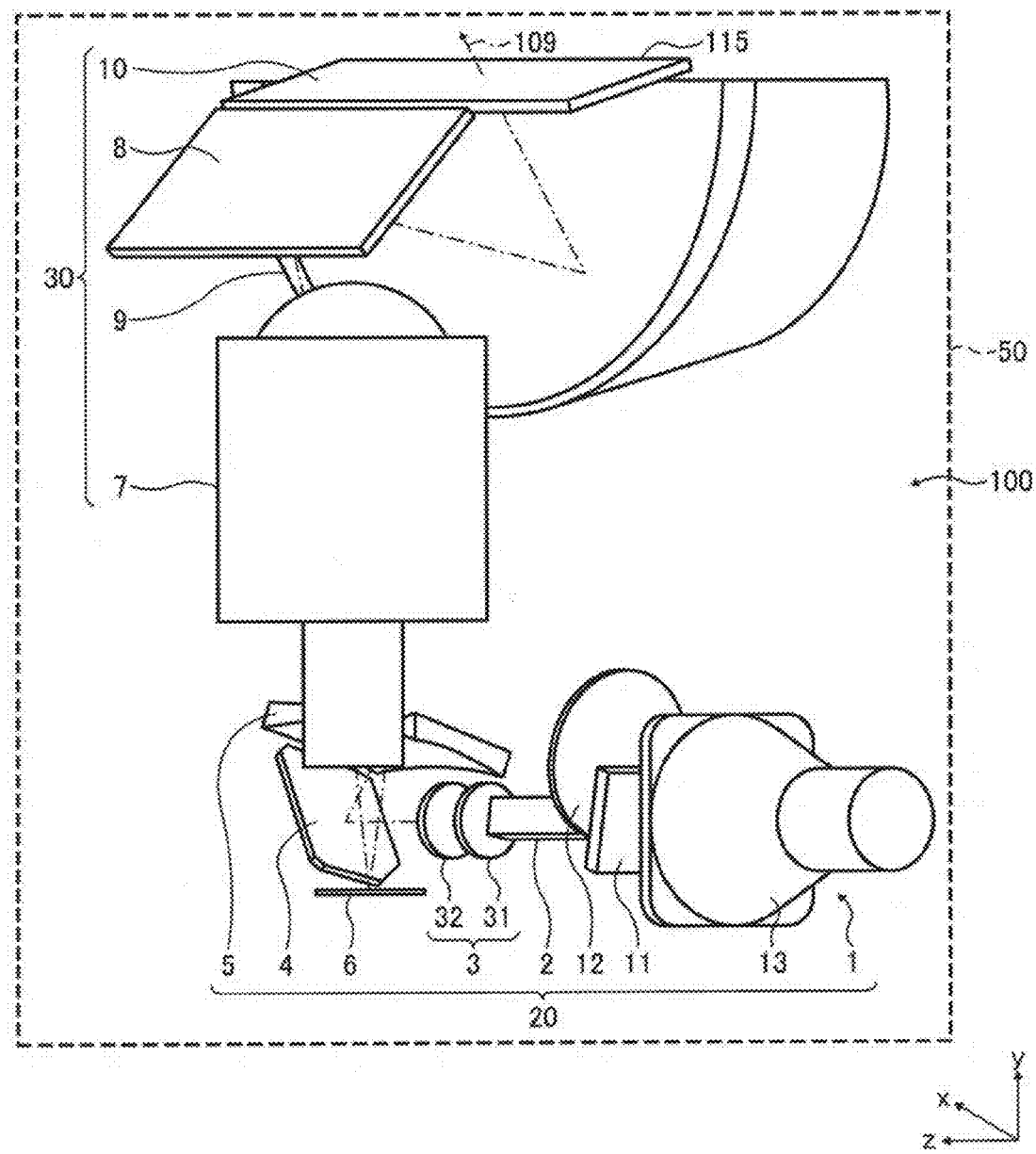
FIG. 3 is a diagram illustrating the optical arrangement of an optical system of the image display apparatus of FIG. 1.
Figure 4:
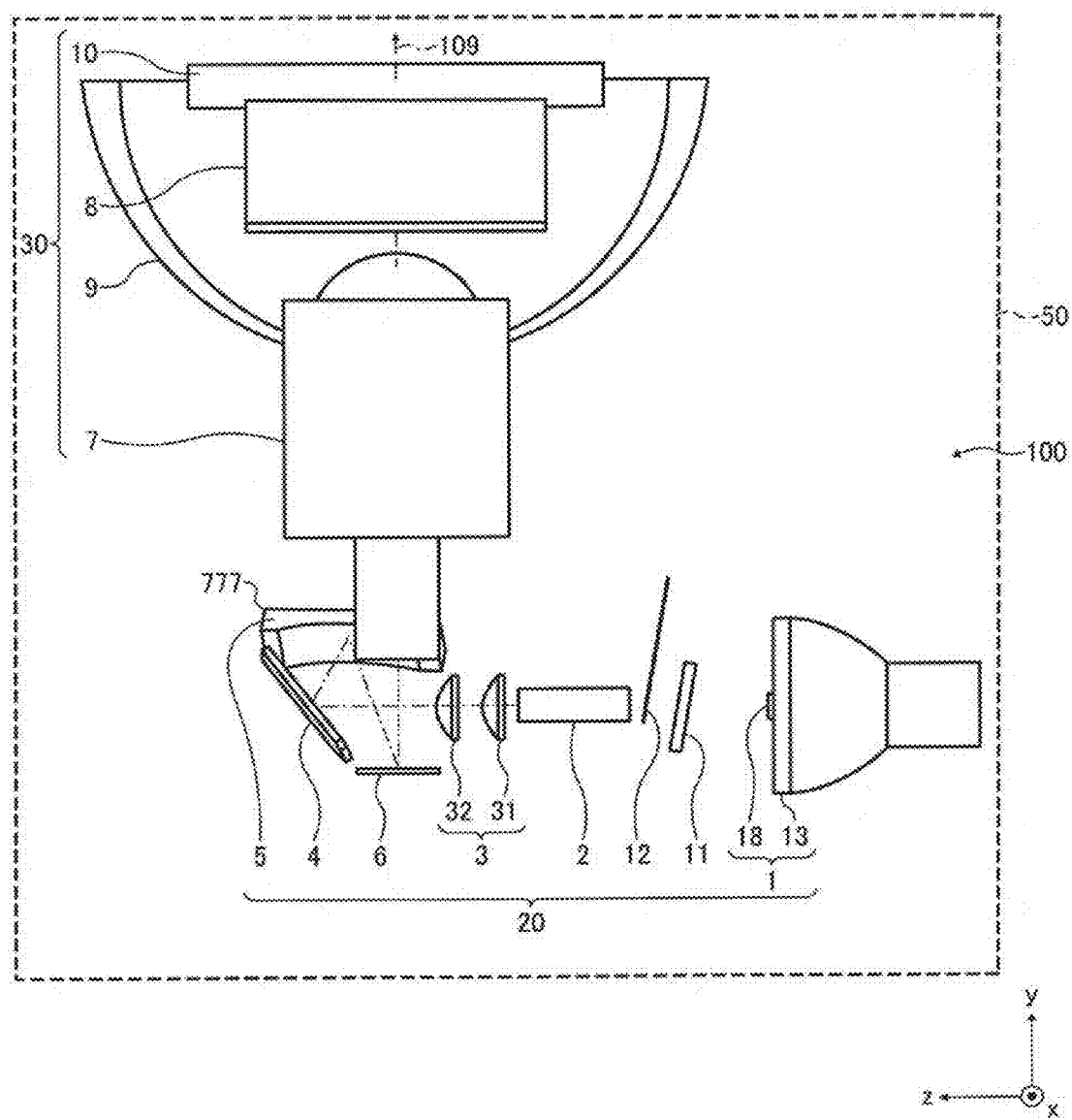
FIG. 4 is a diagram illustrating the optical arrangement of the optical system of FIG. 3 on a yz plane.

As illustrated in FIG. 3 and FIG. 4, the optical system 100 includes an illumination optical system 20, the DMD 6, and a projection optical system 30. The illumination optical system 20 starts from a light source 1 and ends at a second illumination mirror 5, and the projection optical system 30 projects the light modulated by the DMD 6 onto the projection plane 108.

<Configuration of Illumination Optical System>

From the light source 1 side, the illumination optical system 20 includes an explosion-proof glass 11, a color wheel 12, a light tunnel 2, a lens group 3, a first illumination mirror 4, and a second illumination mirror 5, in that order, and guides the light emitted from the light source 1 towards the DMD 6.

The light source 1 may include, for example, various kinds of luminous body 18 such as an ultrahigh-pressure mercury lamp, a xenon arc lamp, a halogen lamp, a light-emitting diode (LED), and a laser. Moreover, the light source 1 includes a reflector 13. On the inner surface of the reflector 13, for example, a condenser mirror with an elliptic surface is formed.

On a first focal point of the elliptic surface of the reflector 13, a luminous body 18 (FIG. 4) is disposed. The reflector 13 concentrates the light emitted from the luminous body 18, which is disposed at the first focal point, towards a second focal point. In other words, the reflector 13 forms a light source image of the luminous body 18 on the second focal point. Note also that the second focal point of the reflector 13 is at an optical input end of the light tunnel 2 or at a position approximately equivalent to the optical input end of the light tunnel 2. The light source 1 emits light in the Z-axis direction. The luminous intensity distribution is isotropic around the Z-axis and approximately rotationally symmetrical.

Figure 5:
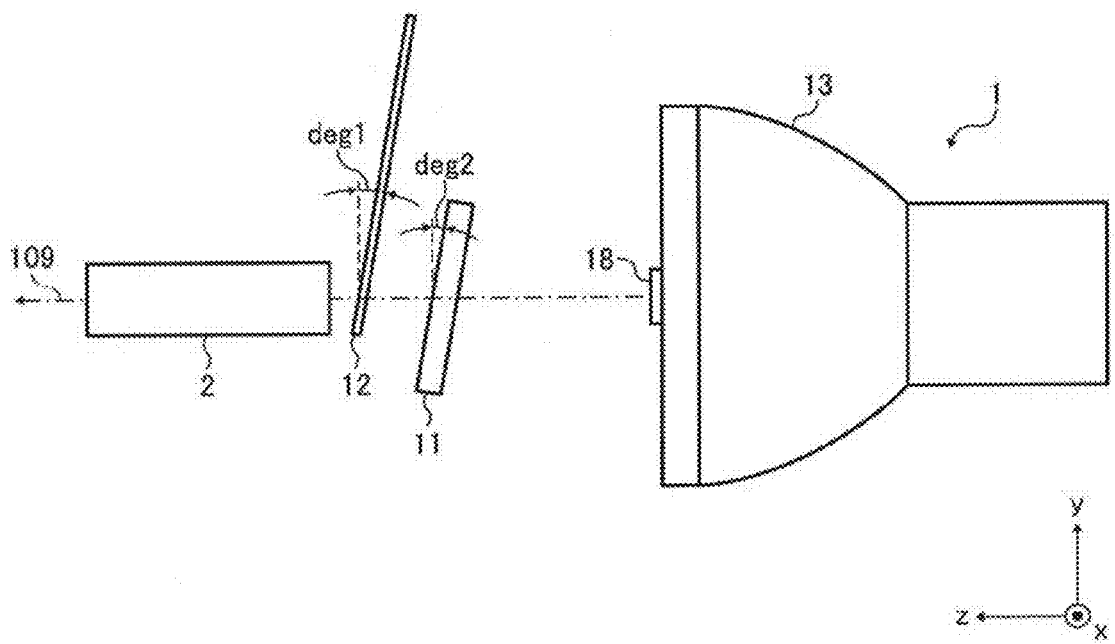
FIG. 5 is a diagram illustrating an optical arrangement from a light source to a light tunnel, on a yz plane, in the image display apparatus of FIG. 1.

As illustrated in FIG. 5, optical elements are disposed along the light exit direction ahead of the light source 1 in the order of the explosion-proof glass 11, the color wheel 12, and the light tunnel 2. The explosion-proof glass 11 and the color wheel 12 are held ahead of the reflector 13. The color wheel 12 and the explosion-proof glass 11 are disposed such that their incident planes and exit planes are inclined with reference to the Z-axis by prescribed angles deg1 and deg2, respectively (for example, 10 degrees). As the color wheel 12 and the explosion-proof glass 11 are disposed as described above, the illumination optical system 20 can reduce ghost light or the like caused due to multiple reflection at the incident plane and exit plane of each optical element.

The color wheel 12 is a known optical filter where the orbicular zone is divided into three areas in accordance with the trichromatic colors of red, green, and blue (RGB). Alternatively, the color wheel 12 may be an optical filter where the orbicular zone is divided into four areas in accordance with the trichromatic colors of RGB and white (W). The color wheel 12 is held in a rotatable manner in the illumination optical system 20.

When the color wheel 12 is driven to rotate, the orbicular zone of the light emitted from the light source 1 crosses the optical path of the light. For this reason, the light emitted from the light source 1 is divided by time division into RGB or four colors including RGB and W, and enters the light tunnel 2. In other words, the image display apparatus 50 projects an image formed by the lights corresponding to the optical filters of the multiple colors of the color wheel 12 onto the projection plane 108. Accordingly, a color image can be formed on the projection plane 108.

The light tunnel 2 is a light mixing device shaped like a rectangular tube where four plate-like reflection planes of mirrors face inward. Aside from the light tunnel 2 as described above, various kinds of luminous body forming device such as a known rod integrator or light pipe may be used as a light mixing device in the illumination optical system 20. The light tunnel 2 has two rectangular openings of approximately the same size at both the optical input end and the optical exit end. As described above, the optical input end of the light tunnel 2 is disposed at the second focal point of the reflector 13 or at a point close to the second focal point of the reflector 13. Accordingly, the light can efficiently be integrated.

The light that has entered the light tunnel 2 is repeatedly reflected inside the light tunnel 2 by the four mirror surfaces that together configure light tunnel 2. Accordingly, the exit-end face of the light tunnel 2 becomes equivalent to a face that is irradiated by a plurality of secondary luminous bodies, and a uniform illumination distribution can be obtained at the exit-end face of the light tunnel 2.

The light tunnel 2 has a movable mechanism where the optical input end of the light tunnel 2 is a supporting section and the angle is adjustable by swinging the front end of the light tunnel 2 in two directions. The two directions of swing due to the movable mechanism include the direction whose rotation axis is in the short side direction of the opening of the light tunnel, and the direction whose rotation axis is in the short side direction of the light tunnel 2. Due to the movable mechanism of the light tunnel 2, the illumination optical system 20 can justify the illumination light that irradiates the DMD 6.

In the optical path of the light that exits from the light tunnel 2 and reaches the DMD 6, optical elements are arranged in the order of the lens group 3, the first illumination mirror 4, and the second illumination mirror 5. The optical exit end of the light tunnel 2 and the reflection plane of the DMD 6 are arranged so as to optically conjugate with each other in an approximate manner. In the illumination optical system 20, the light is reflected from the second illumination mirror 5 to the DMD 6 in the direction towards the origin point from the space on the −X-axis side, +Z-axis side, and the +Y-axis side.

The lens group 3 configures an illumination lens system with the two lenses of the lens 31 and the lens 32. The front lens 31 on the light tunnel 2 side is a double-convex aspherical lens where the incident plane is spherical and the exit plane is aspherical. The rear lens 32 on the first illumination mirror 4 side is a double-convex spherical lens where the incident plane and the exit plane are both spherical. In the present embodiment, the exit plane of the lens 31 is an aspherical surface composed of the aspherical surface defined by the Equation 1 given below and a radius of curvature and aspherical coefficient specified in the Table 1 as will be described later.

$$z'(x', y') = \frac{c \cdot r^2}{1 + \sqrt{(1 - c^2 \cdot r^2)}} + \sum_k c_{2k} \cdot r^{2k}, \quad \text{[Equation 1]}$$

$$c = \frac{1}{R},$$

$$r = \sqrt{(x')^2 + (y')^2}$$

The z' in the Equation 1 denotes a local coordinate system (x', y', z') where the origin point is the vertex of the surface of the lens 31. In other words, the z' in the Equation 1 indicates the amount of sag on the lens surface.

Note that the lens group 3 may be provided with three or more lenses including the lens 31 and the lens 32.

The first illumination mirror 4 is disposed in the optical path of the light that exits from the light tunnel 2 and travels in a straight line, or disposed in the optical path of the light that exits from the light tunnel 2 and roughly travels in a straight line. The first illumination mirror 4 is a planar mirror. The first illumination mirror 4 is arranged in a posture inclined with reference to the XYZ axes, and reflects the light exited through the lens group 3 towards the second illumination mirror 5.

The second illumination mirror 5 is arranged in a posture inclined with reference to the XYZ axes, and reflects the reflection light from the first illumination mirror 4 towards the DMD 6 that is disposed below the second illumination mirror 5. The second illumination mirror 5 is an illumination optical element such as a spherical mirror. However, the shape of the reflection plane of the second illumination mirror 5 is not limited to a spherical shape. For example, the shape of the reflection plane of the second illumination mirror 5 may be an aspherical shape such as of a toroidal surface, polynomial aspherical surface, and a free-form surface.

Due to the optical elements as described above, the illumination optical system 20 can irradiate the DMD 6 with light that has an approximately uniform illumination distribution.

<Configuration of DMD>

As described above, the DMD 6 is an optical modulation element. The DMD 6 includes a plurality of reflection planes, i.e., micromirrors, and modulates the light by deflecting these micromirrors separately. The utilization efficiency of light of the DMD 6 is 66%.

Figure 6:
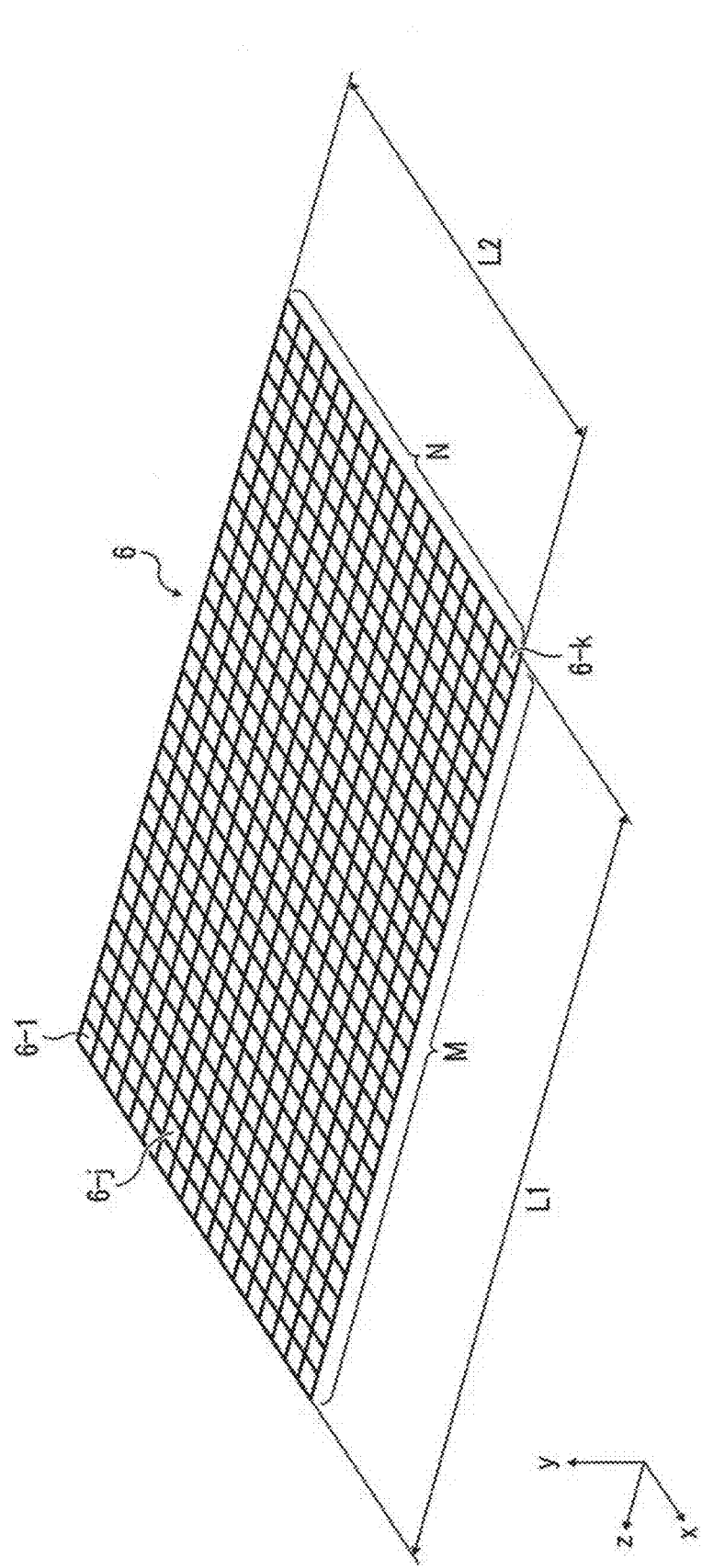
FIG. 6 is a perspective view of a digital micromirror device (DMD) of the image display apparatus of FIG. 1.

As illustrated in FIG. 6, the reflection plane of the DMD 6 are formed by two-dimensionally arranged micromirrors 6-1 to 6-k. The reflection plane of the DMD 6 is on the XZ plane, and the center of the reflection plane of the DMD 6 is the origin point of the absolute coordinate system. A cover glass is placed above the reflection plane of the DMD 6.

In the present embodiment, the size of the micromirrors 6-1 to 6-k is 7.06×7.06 micrometers (μm). The pitch in which the micromirrors 6-1 to 6-k are arranged is 7.56 μm in both the X-axis direction and the Z-axis direction. In regard to the number of micromirrors 6-1 to 6-k, the number M of micromirrors in the longer-side direction (Z-axis direction) is 1920, and the number of micromirrors in the shorter-side direction (X-axis direction) is 1080. In other words, 2073600 (k=M×N) micromirrors 6-1 to 6-k in total are arranged on the DMD 6.

In regard to the size of the DMD 6, the length in the longer-side direction is 1920×7.56 μm=14.5152 millimeters (mm), and the length in the shorter-side direction is 1080×7.56 μm=8.1648 mm. Accordingly, the aspect ratio of the DMD 6 is 1920:1080=16:9. Assuming that the size in the longer-side direction of the DMD 6 is LL and the size in the shorter-side direction of the DMD 6 is LS, the aspect ratio of the DMD 6 is LL/LS=1.77.

The inclination of each of the micromirrors 6-1 to 6-k varies independently. As the inclination of the micromirrors 6-1 to 6-k varies, the micromirrors 6-1 to 6-k can change the directions of travel of the light rays that are reflected at different angles. The angle of deflection of the micromirrors 6-1 to 6-k is ±12 degrees.

Each of the micromirrors 6-1 to 6-k has a turned-on state and a turned off state depending on the reflection angle of a bundle of light rays. Here, the turned-on state indicates a state in which the reflection light from the micromirrors 6-1 to 6-k heads for the projection optical system 30 at a subsequent stage. The turned-off state indicates a state in which the reflection light from the micromirrors 6-1 to 6-k heads for something else other than the projection optical system 30 at a subsequent stage.

Figure 7:
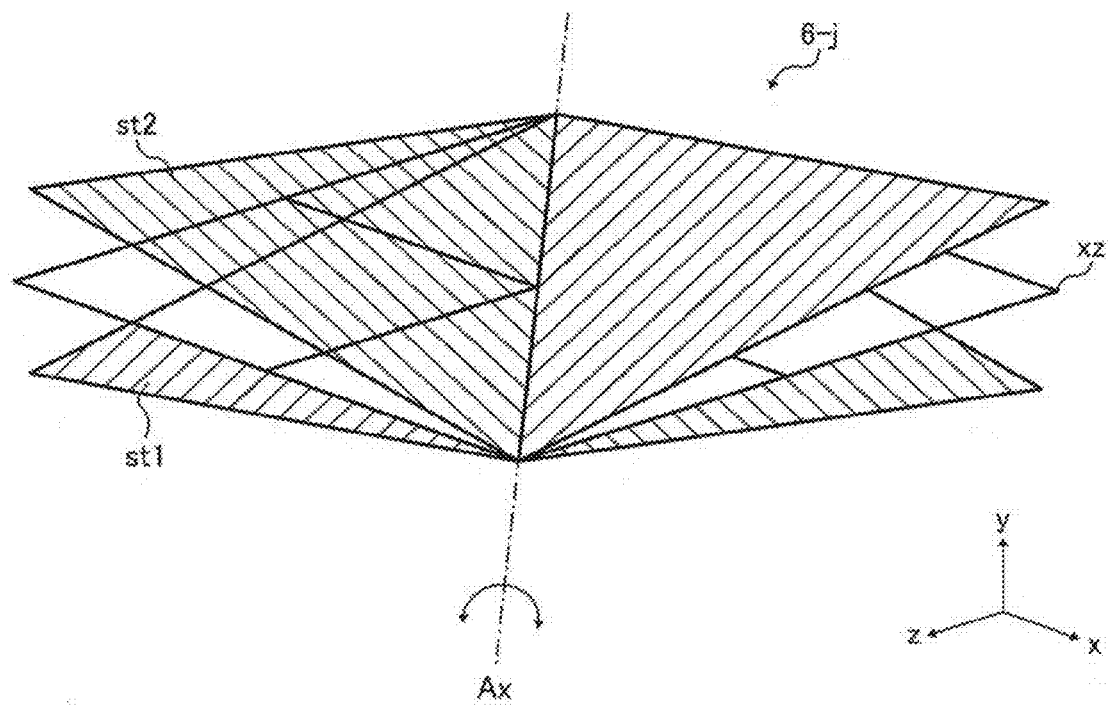
FIG. 7 is a schematic diagram illustrating an inclination state of a single micromirror of the reflection planes of the DMD of FIG. 6.

FIG. 7 illustrates the movement of a micromirror 6-j that is any one of the micromirrors 6-1 to 6-k. The micromirror 6-j rotates on an axis Ax that is parallel to a straight line x=z on the plane xz. When the micromirror 6-j is inclined with reference to the plane xz by +12 degrees as indicated by st1 in FIG. 7, i.e., when the micromirror 6-j is in a turned-on state, the light that is reflected by the micromirror 6-j heads for the projection optical system 30. On the other hand, when the micromirror 6-j is inclined with reference to the plane xz by −12 degrees as indicated by st2 in FIG. 7, i.e., when the micromirror 6-j is in a turned-off state, the light that is reflected by the micromirror 6-j heads for something else other than the projection optical system 30.

Table 1 depicts the specification of the DMD 6 and the parts of the illumination optical system 20 formed between the light source 1 and the second illumination mirror 5.

TABLE 1

| | | | |
|---|---|---|---|
| Light Source 1 | Condensing Angle | 59.5 degrees | |
| Light Tunnel 2 | Slot Size | 6.55 × 3.20 mm | |
| | Length | 30 mm | |
| Lens 3 (Front Lens) | Radius of Curvature $r_{LIGHT\ ENTERING\ SIDE}$ | 36.050 mm | Convex Spherical Surface |
| | Radius of Curvature $r_{LIGHT\ EXITING\ SIDE}$ | −9.999 mm | Convex Aspherical Surface |
| | Aspherical Coefficient $C_{04}$ | 1.8195554E−05 | |
| | Aspherical Coefficient $C_{06}$ | 2.5492468E−06 | |
| | Aspherical Coefficient $C_{08}$ | −2.4282315E−09 | |
| | Aspherical Coefficient $C_{10}$ | −1.4518873E−10 | |
| | Aspherical Coefficient $C_{12}$ | 1.5422572E−13 | |
| | Aspherical Coefficient $C_{14}$ | 4.3465304E−14 | |
| | Center Thickness | 6.3 mm | |
| | Glass Material | L-BSL7 | OHARA |
| | Outside Diameter | φ18.5 | |
| Lens 3 (Rear Lens) | Radius of Curvature $r_{LIGHT\ ENTERING\ SIDE}$ | 98.467 mm | Convex Spherical Surface |
| | Radius of Curvature $r_{LIGHT\ EXITING\ SIDE}$ | −14.738 mm | Convex Spherical Surface |
| | Center Thickness | 6.0 mm | |
| | Glass Material | H-K9L | CDGM |
| | Outside Diameter | Φ19.2 | |
| First Illumination Mirror 4 (Planar Mirror) | Radius of Curvature r | ∞ | Plane Reflection Plane: Silver Coating |
| | Thickness | 2.0 mm | |
| Second Illumination Mirror 5 (Spherical Mirror) | Radius of Curvature r | 74.300 | Concave Spherical Surface |
| | Thickness | 2.0 | Reflection Plane: Silver Coating |
| | External Dimension | 45.5 × 34 mm | Cutout Portion in Longer-side Direction |
| DMD 6 | Cover Glass: Radius of Curvature r | ∞ | Plane |
| | Thickness of Cover Glass | 1.05 mm | |
| | Cover Glass: Refractive Index nd | 1.5163 | S-BSL7 |
| | Cover Glass: Abbe Number vd | 64.1 | |
| | Number of Pixels (Longer-side Direction) | 1,920 | Pixel Size: 7.06 μm |
| | Number of Pixels (Shorter-side Direction) | 1,080 | |
| | Size (Longer-side Direction) | 14.5152 mm | |
| | Size (Shorter-side Direction) | 8.1648 mm | |
| | Pitch of Pixels | 7.56 μm | |

The aspherical coefficients of the lens 3 are all zero unless specified in the above table.

Table 2 depicts the coordinates indicating the relative positions of the optical components of the illumination optical system 20.

TABLE 2

| | | |
|---|---|---|
| Light Source 1 | $x_{CENTEROFLUMINOUSBODY}$ | −9.788 |
| | $y_{CENTEROFLUMINOUSBODY}$ | 18.741 |
| | $z_{CENTEROFLUMINOUSBODY}$ | −123.058 |
| Light Tunnel 2 | $x_{CENTEROFSLOT}$ | −9.788 |
| | $y_{CENTEROFSLOT}$ | 19.273 |
| | $z_{SLOTONLIGHTENTERINGSIDE}$ | −61.066 |
| | $z_{SLOTLIGHTEXITINGSIDE}$ | −31.066 |
| | $\gamma$ | −11.333 |
| Lens 3 (Front Lens) | $x_{VERTEXOFINCIDENTPLANEANDEXITPLANE}$ | −11.113 |
| | $y_{VERTEXOFINCIDENTPLANEANDEXITPLANE}$ | 18.804 |
| | $z_{VERTEXOFINCIDENTPLANE}$ | −28.273 |
| | $z_{VERTEXOFEXITPLANE}$ | −21.973 |
| Lens 3 (Rear Lens) | $x_{VERTEXOFINCIDENTPLANEANDEXITPLANE}$ | −11.113 |
| | $y_{VERTEXOFINCIDENTPLANEANDEXITPLANE}$ | 18.804 |
| | $z_{VERTEXOFINCIDENTPLANE}$ | −15.888 |
| | $z_{VERTEXOFEXITPLANE}$ | −9.888 |
| First Illumination Mirror 4 | x | −13.938 |
| | y | 17.907 |
| | z | 21.568 |
| | α | −34.504 |
| | β | −3.750 |
| | γ | 12.809 |
| Second Illumination Mirror 5 | x | −18.230 |
| | y | 39.668 |
| | z | 12.262 |
| | α | 93.195 |
| | β | 19.093 |
| | γ | −4.451 |
| DMD 6 (Center of Reflection Plane) | x | 0.000 |
| | y | 0.000 |
| | z | 0.000 |

The measurement unit of x, y, and z is mm.
The measurement unit of α, β, and γ is degree.
The rotation around the X-axis is α.
The rotation around the Y-axis is β.
The rotation around the Z-axis is γ.
The rotation takes place in the order of α, β, and γ (the local coordinate system rotates).
In the rotation of α and β, the clockwise direction is the negative direction.
In the rotation of γ, the clockwise direction is the positive direction.
The lens 3 does not rotate.

The arrangement of the optical components of the illumination optical system 20 depicted in Table 2 is determined by moving and rotating these optical components based on the numerical values in Table 2, with reference to the position where the directions and the origin point of the three axes of the local coordinate system (x'y'z' system) of the optical components match the absolute coordinate system (xyz system). In other words, the arrangement of the optical components of the illumination optical system 20 is determined by displacing the local coordinate system of each of the optical components in the xyz directions in Table 2 and then performing the rotation around the X'-axis (α rotation), the rotation around the Y'-axis (β rotation), and the rotation around the Z'-axis (γ rotation).

The arrangement of the optical components of the illumination optical system 20 is described below in detail. The opening planes on the optical input end and the optical exit end of the light tunnel 2 is parallel to the x'y' plane of the local coordinate system (x'y'z' system), where the shorter-side direction of the opening is in the X'-axis direction and the longer-side direction of the opening is in the Y'-axis direction. The relative positions of the opening planes on the optical input end and the optical exit end of the light tunnel 2 are determined by shifting the light tunnel 2 in the X-axis direction, the Y-axis direction, and the Z-axis direction with reference to the origin point of the absolute coordinate system and performing γ rotation for the light tunnel 2.

The central axis (Z'-axis of the local coordinate system) of the lens group 3 is parallel to the Z-axis of the absolute coordinate system, and the relative positions of the lens group 3 are determined by shifting the lens group 3 in the X-axis direction, the Y-axis direction, and the Z-axis direction with reference to the origin point of the absolute coordinate system.

As the first illumination mirror 4 is a planar mirror, the origin point of the local coordinate system may be any desired point. The relative positions of the first illumination mirror 4 are determined by shifting the first illumination mirror 4 in the X-axis direction, the Y-axis direction, and the Z-axis direction with reference to the origin point of the absolute coordinate system and performing γ rotation, β rotation, and γ rotation for the first illumination mirror 4.

The origin point of the local coordinate system of the second illumination mirror 5 is at the vertex of the mirror surface, and the relative positions of the second illumination mirror 5 is determined in a similar manner to the first illumination mirror 4.

As described above, the reflection plane of the DMD 6 is formed by the multiple micromirrors 6-1 to 6-k. The reflection plane of the DMD 6 is parallel to the xz plane of the absolute coordinate system.

<Configuration of Projection Optical System>

As illustrated in FIG. 3 and FIG. 4, the projection optical system 30 projects the light reflected by the micromirrors 6-1 to 6-k of the DMD 6 in the turned-on state onto the projection plane 108. The projection optical system 30 magnifies an image formed by the micromirrors 6-1 to 6-$k$ of the DMD 6 and projects the magnified image onto the projection plane 108.

The projection optical system 30 includes a projection lens system 7, a first projector mirror 8, a second projector mirror 9, and a flat glass 10 that serves as a light-transmissive flat plate, in that order from the DMD 6, in the optical path of a light beam 109 that heads for the projection plane 108 from the DMD 6. In the projection optical system 30, an intermediate image is formed between the DMD 6 and the second projector mirror 9. The light beam 109 indicates the optical path of a main light beam that is emitted through the center of the light tunnel 2 and reaches the projection plane 108.

FIG. 8A is a side view of the projection lens system 7 according to the present embodiment. FIG. 8B is a diagram illustrating the optical arrangement of the projection lens system 7 according to the present embodiment. In the projection lens system 7, the lenses that together configure a projection lens group 16 as illustrated in FIG. 8B are stored inside a barrel 15 for projection lenses on a light entering side and a barrel 14 for projection lenses on a light exiting side as illustrated in FIG. 8B. The projection lens group 16 includes fifteen lenses 801 to 815.

The optical axis of the projection lens system 7 is parallel to the Y-axis of the absolute coordinate system, and involves no decentering in the Z-axis direction at the position where the optical axis of the projection lens system 7 is decentered by 5.3 mm from the center of the DMD 6 in the X-axis direction.

The light that is emitted through the projection lens system 7 is reflected by the first projector mirror 8, and then is reflected by the second projector mirror 9. Then, the light passes through the flat glass 10, and reaches the projection plane 108.

Table 3 indicates the specification of the projection optical system 30. Table 4 indicates conic constants and aspheric constants on the aspherical surface of the lenses of the projection lens system 7.

TABLE 3

| PLANE NUMBER | R | D | nd | vd | GLASS MATERIAL | |
|---|---|---|---|---|---|---|
| 1 | ∞ | 1.00 | | | | |
| 2 | ∞ | 1.00 | 1.51633 | 64.1420 | S-BSL7 | OHARA |
| 3 | ∞ | 28.00 | | | | |
| 4* | 16.072 | 4.56 | 1.49700 | 81.5459 | S-FPL51 | OHARA |
| 5* | −31.171 | 1.50 | | | | |
| 6 | 24.043 | 1.40 | 1.85478 | 24.7990 | S-NBH56 | OHARA |
| 7 | 35.922 | 0.92 | | | | |
| 8 | 76.573 | 0.80 | 1.90366 | 31.3150 | TAFD25 | HOYA |
| 9 | 11.530 | 2.50 | 1.53775 | 74.7031 | S-FPM3 | OHARA |
| 10 | 40.686 | 1.27 | | | | |
| STOP | ∞ | 1.98 | | | | |
| 11 | −46.999 | 0.70 | 1.53775 | 74.7031 | S-FPM3 | OHARA |
| 12 | 45.327 | 7.39 | | | | |
| 13 | 30.390 | 5.12 | 1.58913 | 61.1526 | L-BAL35 | OHARA |
| 14 | −20.460 | 0.30 | | | | |
| 15* | 48.490 | 2.01 | 1.81600 | 46.6206 | S-LAH59 | OHARA |
| 16* | 21.739 | 5.65 | | | | |
| 17 | 97.638 | 12.26 | 1.85478 | 24.7990 | S-NBH56 | OHARA |
| 18 | −38.981 | 1.00 | 1.91650 | 31.6041 | S-LAH88 | OHARA |
| 19 | 55.018 | 11.85 | | | | |
| 20 | 66.313 | 3.67 | 1.59522 | 67.7357 | S-FPM2 | OHARA |
| 21 | 291.597 | VARIABLE A | | | | |
| 22 | 44.286 | 6.34 | 1.75700 | 47.8232 | S-LAM54 | OHARA |
| 23 | 238.751 | VARIABLE B | | | | |
| 24 | −34.688 | 2.00 | 1.91650 | 31.6041 | S-LAH88 | OHARA |
| 25 | −42.971 | 1.01 | | | | |
| 26 | −43.209 | 2.20 | 1.83481 | 42.7253 | S-LAH55V | OHARA |
| 27 | −245.623 | 0.30 | | | | |
| 28* | 77.491 | 3.00 | 1.53046 | 55.8000 | RESIN | |
| 29* | 36.052 | VARIABLE C | | | | |
| 30* | −38.246 | 5.30 | 1.53046 | 55.8000 | RESIN | |
| 31* | −34.285 | VARIABLE D | | | | |
| 32 | ∞ | −89.35 | REFLECTION PLANE | | | |
| 33** | ∞ | VARIABLE E | REFLECTION PLANE | | | |

TABLE 4

| PLANE NUMBER | K | A4 | A6 | A8 | A10 | A12 | A14 | A16 |
|---|---|---|---|---|---|---|---|---|
| 4* | −0.0286 | −2.2212E−05 | | | | | | |
| 5* | −6.3687 | 1.8251E−05 | 2.9605E−08 | | | | | |
| 15* | −0.1900 | −4.7300E−06 | 3.0566E−09 | | | | | |
| 16* | −2.5954 | −9.8654E−06 | 4.1599E−08 | | | | | |
| 28* | 1.7094 | −3.2650E−06 | −5.2318E−08 | 1.7575E−10 | −2.9937E−13 | 2.9284E−16 | −1.805E−19 | 5.7383E−23 |
| 29* | −1.1409 | −3.0557E−05 | 1.8918E−08 | 2.8351E−12 | −1.4488E−14 | | | |
| 30* | −0.3987 | −2.5592E−05 | 7.6782E−09 | 1.7891E−11 | 5.9350E−14 | −9.5308E−17 | 3.7237E−20 | |

TABLE 4-continued

| PLANE NUMBER | K | A4 | A6 | A8 | A10 | A12 | A14 | A16 |
|---|---|---|---|---|---|---|---|---|
| 31* | −0.8694 | −2.0691E−05 | 9.5884E−09 | −2.5204E−11 | 6.3625E−14 | 6.6004E−18 | −6.653E−20 | 3.1083E−23 |
| 28 | | | | | | | | |
| 29 | | | | | | | | |

In Table 3 and Table 4, plane number 1 indicates the reflection plane of the DMD 6, and plane number 2 indicates the cover glass of the MID 6. Moreover, plane numbers 4 to 31 indicate the incident planes and exit planes of the lenses that together configure the projection lens system 7. Further, plane numbers 32 and 33 indicate the reflection planes of the first projector mirror 8 and the second projector mirror 9, respectively. Note that in Table 3 and Table 4, "*" that is appended to a plane number indicates the plane is aspherical.

The denotations of the symbols in the tables are as follows.
R: Radius of curvature (paraxial radius of curvature for aspherical surface)
nd: Reflective index
vd: Abbe number
K: Conic constant of aspherical surface
Ai: i-th aspheric constant
Cj: Free-form surface coefficient The aspherical shape of the lenses that together configure the projection lens system 7 is expressed in the known Equation 2 given below, where C, H, K, and Ai denote the inverse number (paraxial curvature) of the paraxial radius of curvature, the distance from an optical axis, the conic constant, and the aspheric constant, respectively.

$$z'(x', y') = \frac{C \cdot H^2}{1 + \sqrt{(1 - (1+K) \cdot C^2 \cdot H^2)}} + \sum_{i=1} Ai \cdot H^i,$$

$$H = \sqrt{(x')^2 + (y')^2}$$

[Equation 2]

The shape of the lenses that together configure the projection lens system 7 is determined by applying the paraxial radius of curvature C, the conic constant K, and the aspherical coefficient Ai to Equation 2.

The z' in the Equation 2 denotes the amount of sag when the vertex of the lens surface is assumed to be the origin point of a local coordinate system (x', y', z'). In the projection lens system 7, the Z'-axis direction of the local coordinate system is in the Y-axis direction of the absolute coordinate system.

As depicted in Table 3, space A between plane number 21 and plane number 22, space B between plane number 23 and plane number 24, space C between plane number 29 and plane number 30, space D between plane number 31 and plane number 32, space E between plane number 33 and the projection plane 108 are all variable. Table 5 indicates how the space in the projection optical system 30 varies according to the image size of a projection image.

TABLE 5

| PROJECTION IMAGE SIZE | SHORT DISTANCE 60 INCHES | STANDARD 80 INCHES | LONG DISTANCE 100 INCHES |
|---|---|---|---|
| VARIABLE A | 2.00 | 2.58 | 2.76 |
| VARIABLE B | 10.57 | 10.37 | 10.26 |
| VARIABLE C | 23.94 | 19.24 | 16.34 |
| VARIABLE D | 42.77 | 47.08 | 49.92 |
| VARIABLE E | 294.78 | 383.29 | 471.29 |

As depicted in Table 5, the space A, B, C, D, and E of the lens surface of the projection lens system 7 varies according to the image size of a projection image.

In Table 3, the first projector mirror 8 of plane number 32 is a planar mirror, and the second projector mirror 9 of plane number 33 is a concave free-form surface mirror. The shape of the free-form surface of the second projector mirror 9 is expressed in Equation 3 known in the art.

$$z'(x', y') = \frac{C \cdot H^2}{1 + \sqrt{(1 - (1+K) \cdot C^2 \cdot H^2)}} + \sum_{j=1} Cj \cdot (x')^m (y')^n,$$

$$H = \sqrt{(x')^2 + (y')^2}$$

[Equation 3]

Note that "j" in Equation 3 is expressed in Equation 4.

$$j = \frac{(m+n)^2 + m + 3n}{2} + 1$$

[Equation 4]

Table 6 indicates conic constants and free-form surface coefficients of the free-form surface of the second projector mirror 9.

TABLE 6

| | 33 PLANES |
|---|---|
| K | 0 |
| C4 | 1.0294E−02 |
| C6 | −3.3803E−03 |
| C8 | 9.0381E−05 |
| C10 | −2.6457E−04 |
| C11 | −6.3139E−07 |
| C13 | 7.9457E−06 |
| C15 | −5.9748E−07 |
| C17 | −2.1263E−08 |
| C19 | 1.8556E−07 |
| C21 | 3.9681E−08 |
| C22 | 1.0780E−10 |
| C26 | 1.0654E−09 |
| C28 | 4.3869E−10 |
| C30 | −3.2801E−12 |
| C32 | −5.8231E−11 |
| C34 | −1.3670E−11 |
| C36 | −3.2111E−13 |
| C37 | −2.1683E−14 |
| C39 | 3.6747E−14 |

TABLE 6-continued

| | 33 PLANES |
|---|---|
| C41 | −5.7433E−13 |
| C43 | −1.2744E−13 |
| C45 | −1.7320E−14 |
| C47 | 5.8383E−16 |
| C49 | 3.2200E−15 |
| C51 | −7.7378E−16 |
| C53 | 8.3474E−16 |
| C55 | 7.8742E−17 |
| C56 | 2.6160E−18 |
| C58 | 1.1070E−17 |
| G60 | 2.8420E−17 |
| C64 | 9.4203E−18 |
| C66 | 1.1614E−18 |

Here, it is assumed that the projection distance of an image is the distance between the projection plane 108 and a point of intersection of the second projector mirror 9 and the optical axis of the projection lens system 7, and (projection distance)/(width of projection image) is referred to as TR. Table 7 indicates the relation between a projection image size and TR in the image display apparatus according to the present embodiment.

TABLE 7

| | SHORT DISTANCE 60 INCHES | STANDARD 80 INCHES | LONG DISTANCE 100 INCHES |
|---|---|---|---|
| PROJECTION DISTANCE | 299.63 | 388.15 | 476.14 |
| TR | 0.226 | 0.219 | 0.215 |

In the image display apparatus 50 according to the present embodiment, TR≤0.3 when the projection image size is between 60 to 100 inches.

Note also that the reflection plane of the first projector mirror 8 of plane number 32 depicted in Table 3 is parallel to an imaginary plane obtained by rotating the plane xz of FIG. 7 around the Z-axis by 45 degrees. The local coordinate system of the reflection plane of the second projector mirror 9 of plane number 33 is determined with reference to an imaginary position obtained by rotating the plane xz around the Z-axis by 77.2 degrees.

As illustrated in FIG. 2, FIG. 3, and FIG. 4, the flat glass 10 is disposed at the last stage of the projection optical system 30, and is inclined towards the 1 rotation with reference to the plane xz (see also FIG. 4, FIG. 5, and FIG. 6). In other words, the flat glass 10 is arranged such that the normal line of the incident plane and the exit plane has some angle with reference to the projection plane 108. The flat glass 10 prevents dust from entering the optical system 100 inside the housing of the image display apparatus 50.

Figure 9:
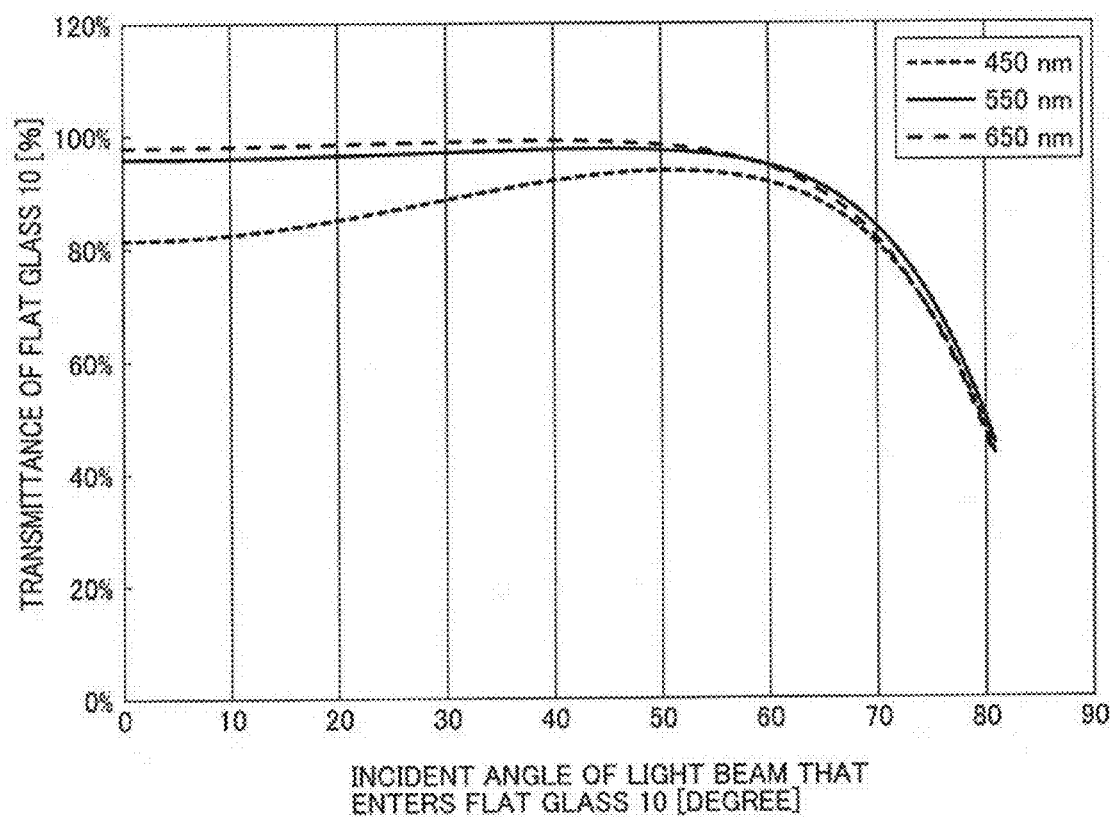
FIG. 9 is a graph illustrating the relation between the incident angle of light beam that enters a flat glass of the image display apparatus of FIG. 1 and the transmittance of the flat glass.

The incident plane and the exit plane of the flat glass 10 is coated by multilayered nonreflective coating. FIG. 9 is a graph indicating the relation between the incident angle of light beam that enters the flat glass 10 and the transmittance of the flat glass 10, for each light beam with wavelengths of 450, 550, and 650 (nanometer (nm)).

Figure 10:
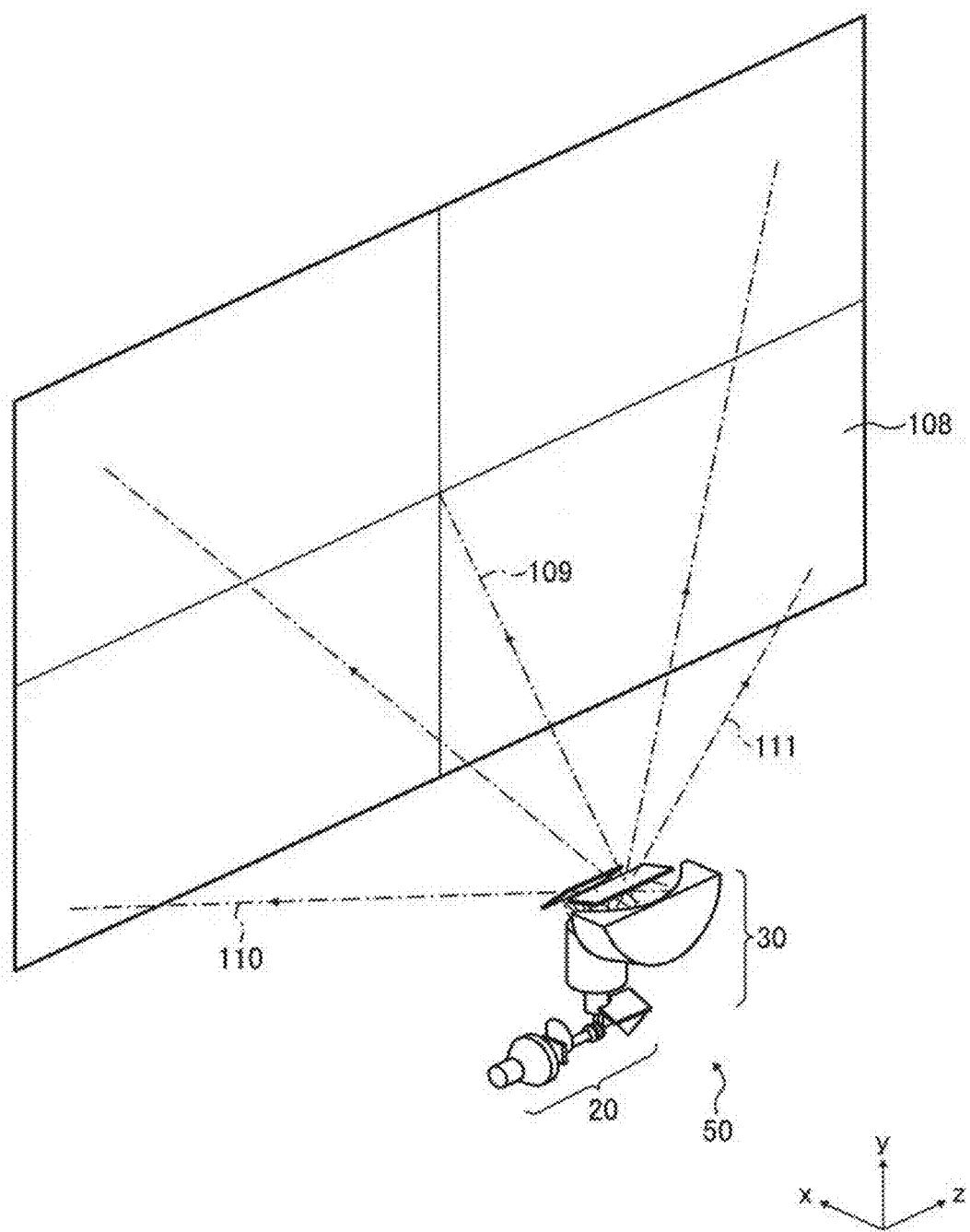
FIG. 10 is a schematic diagram illustrating relation between an image display apparatus and light beams that head for the center and the four corners of a projection plane, according to an embodiment of the present invention.

FIG. 10 is a schematic diagram illustrating relation between the image display apparatus 50 and the light beams that head for the center and the four corners of the projection plane 108, according to the present embodiment. As illustrated in FIG. 10, a projector with small TR like the image display apparatus 50 tends to have a wide range of incident angle at which the light enters the flat glass 10. The light beam 110 and the light beam 111 are emitted from the projection optical system 30 of the image display apparatus 50 and dispersed towards lower corners in the right and left directions (+Z-axis direction and −Z-axis direction) of the projection plane 108, and the incident angles that the light beam 110 and the light beam 111 form with the flat glass 10 become maximum. For this reason, the transmittance of the light beam 110 and the light beam 111 on the flat glass 10 decrease. As these right and left lower corners of a projection image are irradiated with the light beam 110 and the light beam 111, the illuminance also decreases to a larger degree than other portions of the projection image.

If the tilt angle of the β rotation of the flat glass 10 is increased with reference to the plane xz, the incident angles that light beams heading for right and left lower corners of a projection image form with the flat glass 10 can be narrower. However, if the tilt angle is increased as above, the position of an edge 115 of the flat glass 10 becomes higher in the +Y-axis direction, and the apparatus size becomes too large.

The evenness in illuminance on a projection image serves as an useful index for determining the performance of a projector. The evenness in illuminance on a projection image is defined by a center-to-peripheral illuminance ratio. The center-to-peripheral illuminance ratio is defined in "Information to be included in specification sheets—Data projector; Japanese Industrial Standards (JIS) X 6911:2003". The center-to-peripheral illuminance ratio is expressed in percentage, and indicates the illuminance ratio of the illuminance at the center of an all-white image to the average illuminance of four peripheral points of the same image.

Figure 11:
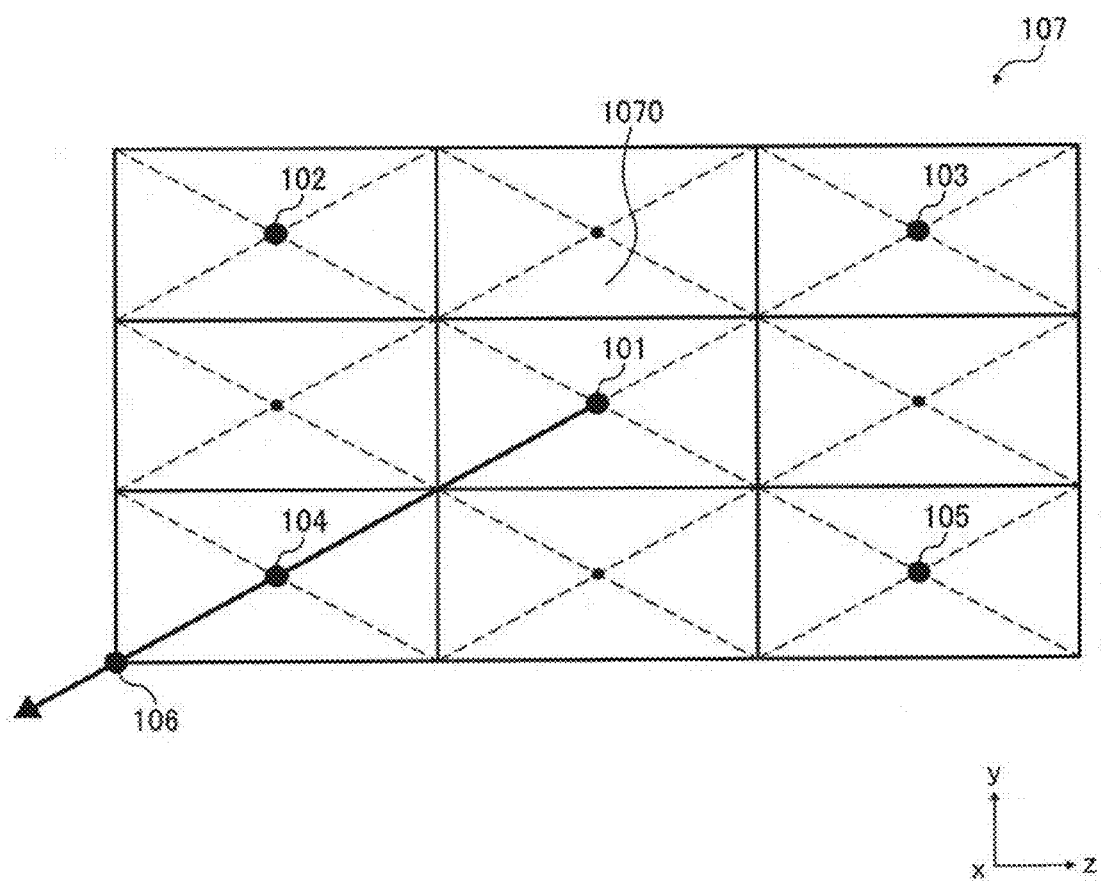
FIG. 11 is a schematic diagram illustrating the center point and its four peripheral points of a projection image projected by the image display apparatus of FIG. 1.

FIG. 11 illustrates an example of a projection image 107 where the center-to-peripheral illuminance ratio is to be checked, according to the present embodiment. A center point 101 is in the center of the projection image 107. When the projection image 107 is divided into nine (3×3) areas 1070, the four peripheral points are a point 102, a point 103, a point 104, and a point 105. These points 102, 103, 104, and 105 are the center points of the four areas of the nine areas 1070 at the diagonal four positions around the center point 101.

However, it is desired that sufficient illuminance be achieved not only at the center and the four peripheral points of a projection image but also at further outer areas of the four peripheral points.

Figure 12:
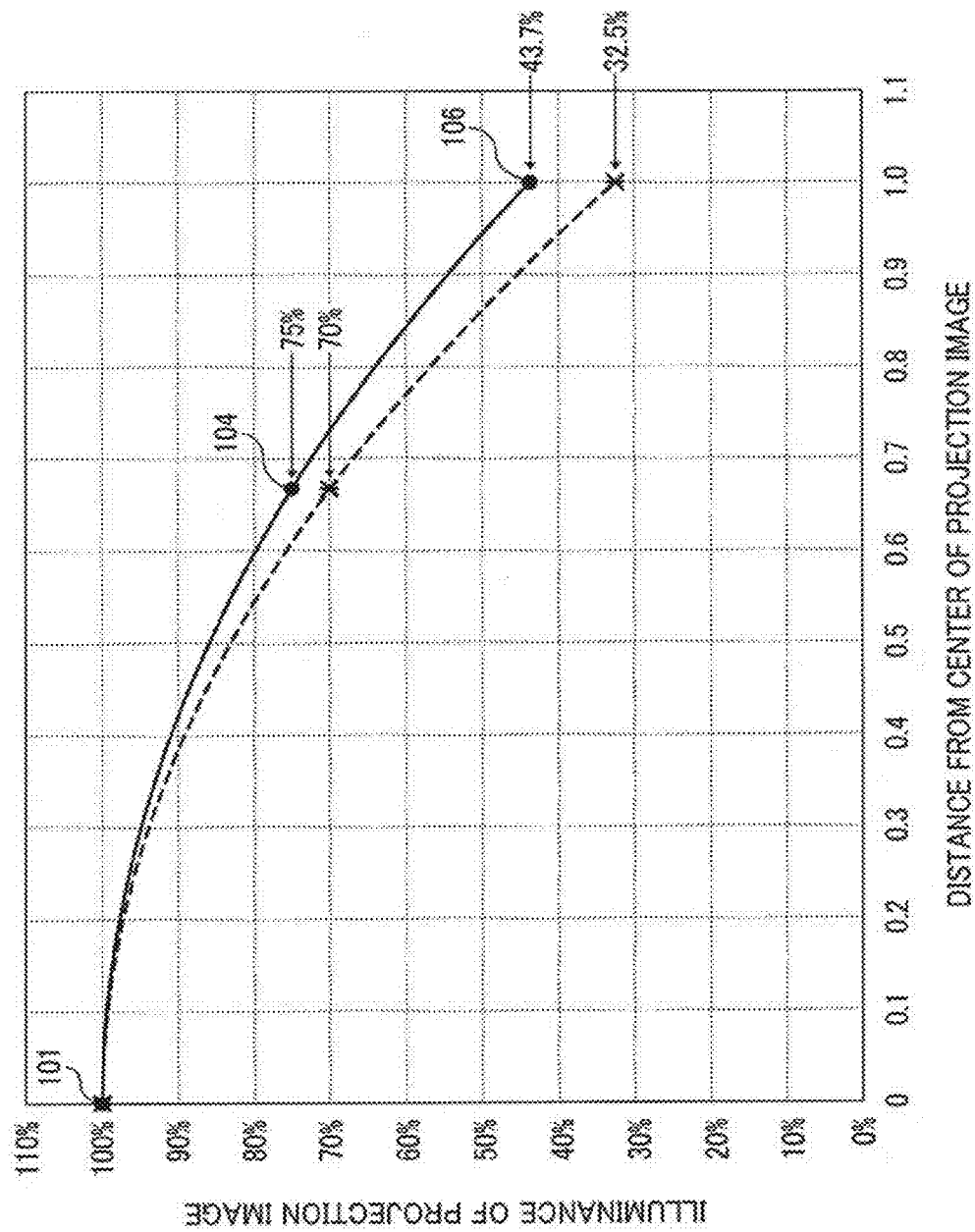
FIG. 12 is a graph illustrating the changes in illuminance on an axis drawn from the center to a corner of the projection image projected by the image display apparatus of FIG. 1.

FIG. 12 is a graph plotting the illumination distribution on the axis that is drawn from the center point 101 of the projection image 107 (origin point) to a point 106 at the bottom-left corner of the projection image 107, as illustrated in FIG. 11, where it is assumed that the illuminance at the center point is 100% and the illuminance at the point 104 is 70% or 75%. Note that the graph of FIG. 12 is drawn in an approximate quadric function. In other words, assuming that the projection image 107 has an isotropic illumination distribution around the center point 101, FIG. 12 is a graph plotting the illumination distribution in which the center-to-peripheral illuminance ratio is 70% or 75%. Note also that the horizontal axis in FIG. 12 is normalized by assuming that the distance between the center point 101 and the point 106 is 1. The distance between the origin point and the point 104 is 0.67.

According to the graph of FIG. 12, it is desired that the illuminance at the outermost point 106 on the projection image 107 be at least 32.5% or 43.7% when the center-to-peripheral illuminance ratio is about 70% or 75%.

As described above, in the image display apparatus 50, the minimum illuminance on the projection image 107 is determined by the specification or relative positions of the components that together configure the illumination optical system 20 and the projection optical system 30.

In the image display apparatus 50 according to the present embodiment, the illumination optical system 20 and the projection optical system 30 are configured as follows in view of the above circumstances. Due to such configuration, the image display apparatus 50 according to the present embodiment, which is small and has very short focal length, can evenly illuminate the projection plane 108.

<Relative Positions of Second Illumination Mirror and Barrel for Projection Lenses on Light Entering Side, and Illumination Distribution on DMD>

Figure 13:
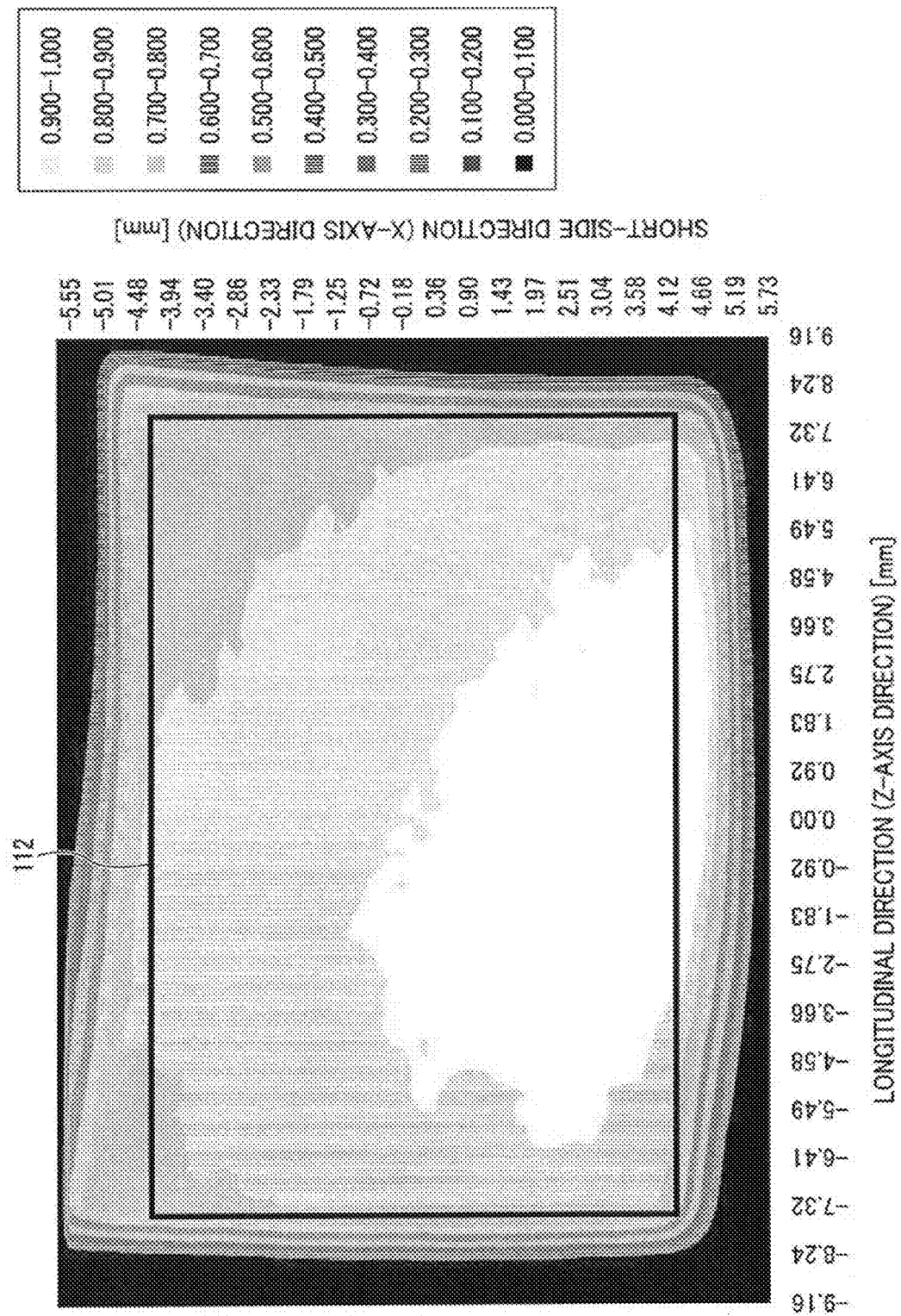
FIG. 13 illustrates an example illumination distribution of light that illuminates the reflection planes of the DMD of FIG. 6.

FIG. 13 illustrates an example illumination distribution of the light that illuminates the DMD 6 on the reflection plane of the DMD 6, according to the present embodiment. FIG. 13 is a tabulation of illuminance distribution that is normalized assuming that the maximum illuminance on the surface is 100%. In FIG. 13, the area inside a rectangular solid line 112 corresponds to the valid range of the DMD6.

Figure 14:
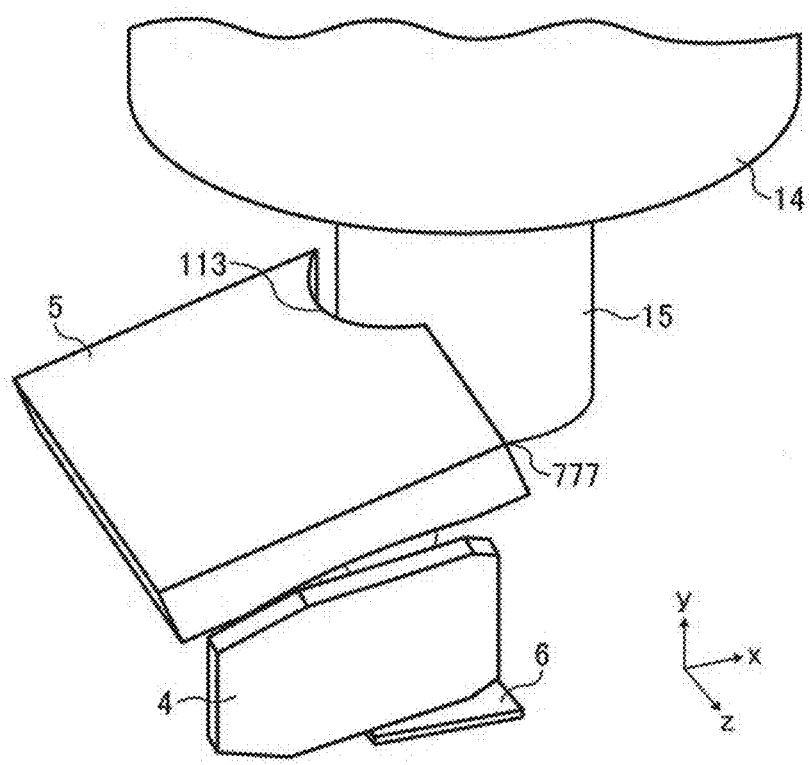
FIG. 14 is a diagram illustrating the optical arrangement of a second illumination mirror and a notch formed at a part of the second illumination mirror in the image display apparatus of FIG. 1.

FIG. 14 illustrates relative positions of the second illumination mirror 5 and the barrel 15 for projection lenses on a light entering side, according to the present embodiment. The incident directions at which the light enters the DMD 6 are determined by the deflection angles of the micromirrors 6-1 to 6-$k$ that together configure the DMD6, the position of the entrance pupil of the projection lens system 7, or the like. Due to this configuration, in the image display apparatus 50, the second illumination mirror 5, which is arranged immediately before the DMD 6, can be made close to the barrel 15 for projection lenses on a light entering side.

As illustrated in FIG. 14, the second illumination mirror 5 has a notch 113 at a position close to the barrel 15 for projection lenses on a light entering side. When viewed from the Y-axis direction, the notch 113 is cut in a round shape along the external shape of the barrel 15. When the diameter of the barrel 15 for projection lenses on a light entering side is not even in the axial direction, a largest diameter of the barrel 15 at an area on the DMD 6 side with reference to a point 777 of the second illumination mirror 5 that is farthermost from the DMD 6 is considered to be the diameter of the barrel 15.

Due to the notch 113 of the second illumination mirror, the barrel 15 for projection lenses on a light entering side can protrude towards the DMD 6 without interfering with the second illumination mirror 5. Note also that the shape of the notch 113 is appropriate as long as a part of the notch 113 is cut along the external shape of the barrel 15, and the other parts may be shaped like a straight line.

Assuming that the external radius of the barrel 15 for projection lenses on a light entering side is r [mm], it is desired that the radius of the notch 113 be about r+1 [mm] so as to avoid interference between the second illumination mirror 5 and the barrel 15 due to a structural error in assembly. Moreover, it is desired that the distance between the periphery of the second illumination mirror 5 and an effective area of the reflection plane of the second illumination mirror 5 be about 1.5 [mm]. Accordingly, the effective area of the reflection plane of the second illumination mirror 5 on the notch 113 side is distant from the center of the barrel 15 by equal to or longer than r+2.5 [mm].

In the illumination optical system 20 according to the present embodiment, as illustrated in FIG. 8A, the outside diameter of the barrel 15 on the DMD 6 side (such diameter will be referred to as a "front-end diameter of barrel" in the following description) is referred to as $\varphi$, and the distance between the reflection plane of the DMD 6 and the front end of the barrel 15 is referred to as H. When the value of the front-end diameter of barrel $\varphi$ is equal to or greater than a certain value, the radius of the notch 113 of the second illumination mirror 5 increases accordingly. In such cases, a part of the light that is reflected by the second illumination mirror 5 and heads for the DMD 6 is lost due to the notch 113. Alternatively, when the distance H becomes equal to or shorter than a certain distance, a part of the light that is reflected by the second illumination mirror 5 and heads for the DMD 6 is lost due to the front end of the barrel 15.

Figure 15:
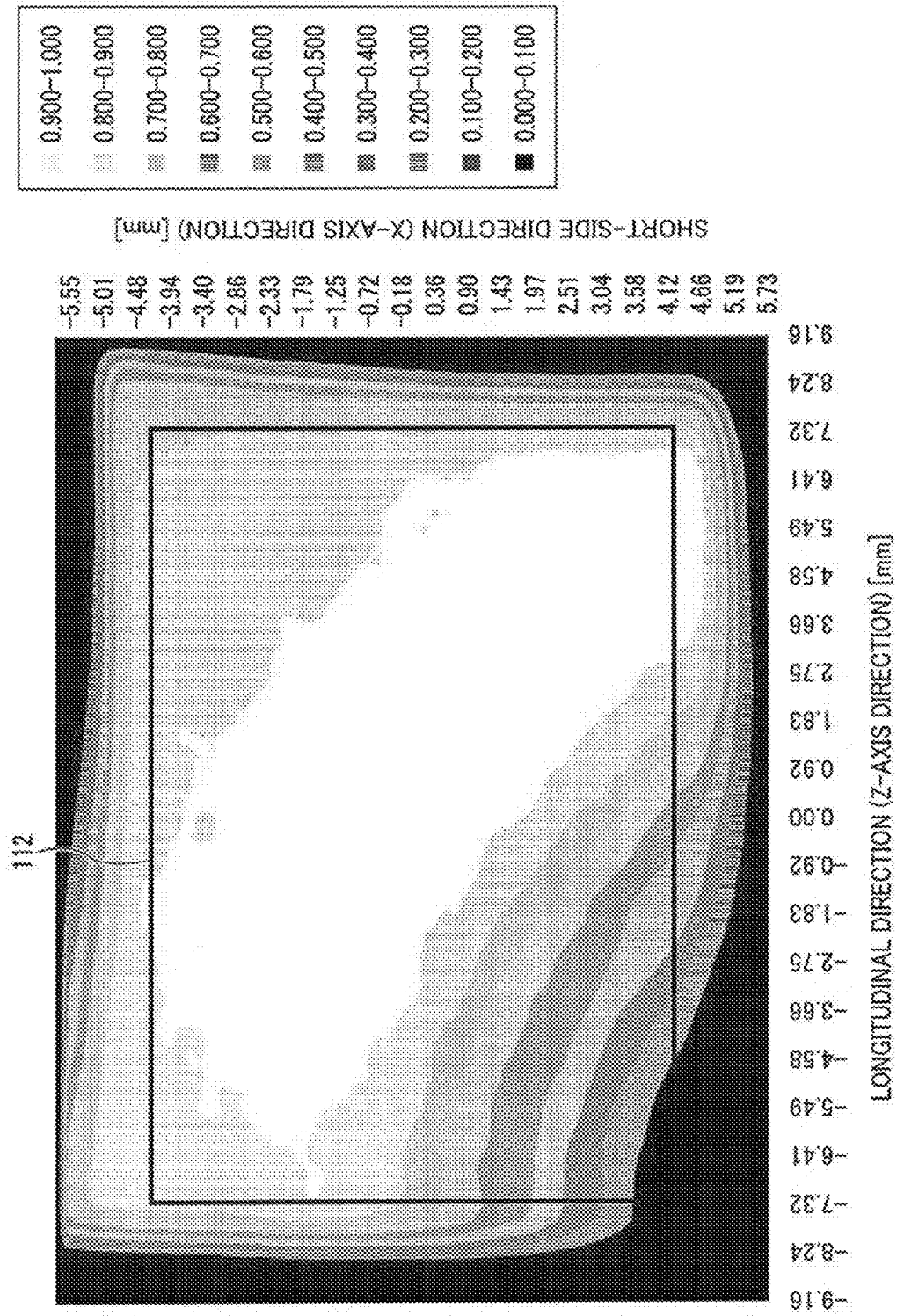
FIG. 15 is a diagram illustrating changes in illumination distribution on reflection planes of a DMD, which are caused due to loss in laser-beam bundle that illuminates the DMD, according to an embodiment of the present invention.

FIG. 15 illustrates an example illumination distribution in a state where the illuminance on the reflection plane of the DMD 6 decreases due to the loss at the barrel 15 for projection lenses on a light entering side, according to the present embodiment. A reduction in illuminance due to the loss of light at the notch 113 of the second illumination mirror 5, i.e., the loss of light at the front end of the barrel 15, is developed from a corner on the +X-axis side and a corner on the −Z-axis side on the reflection plane of the DMD 6. A position at which a reduction in illuminance occurs on the reflection plane of the DMD 6 corresponds to a position towards which the light beam 110 heads in FIG. 10, i.e., a lower left corner of the projection image on the projection plane 108 when the projection image is viewed from the front.

As described above, the optical transmittance of the flat glass 10 decreases at right-and-left lower corners of the projection image. For this reason, reduction in illuminance tends to occur. In other words, a lower left corner of the projection image tends to have a lowest illuminance due to both the effect of loss of light and a reduction in optical transmittance of the flat glass 10.

Figure 16:
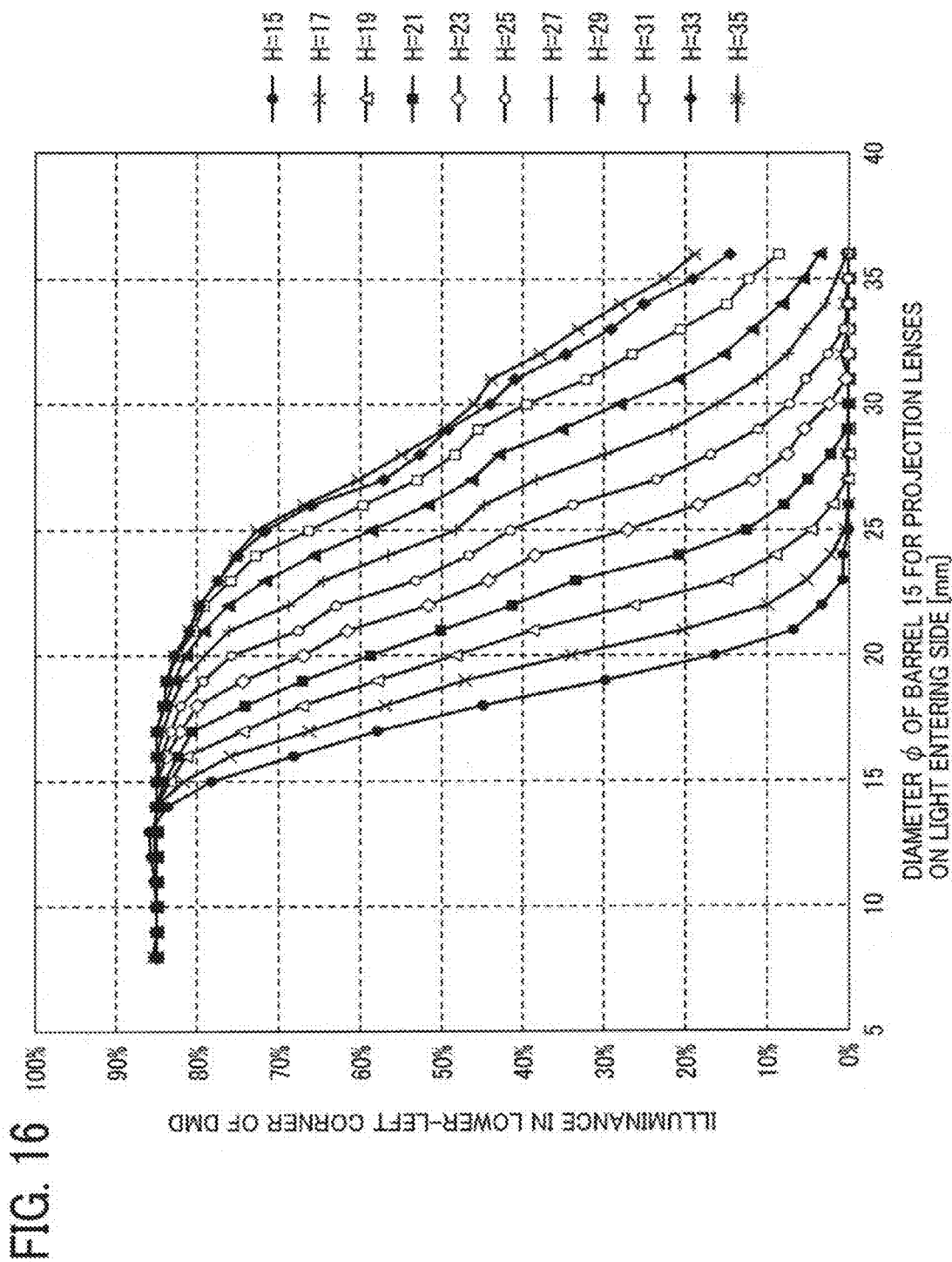
FIG. 16 is a graph illustrating the relation between the diameter of a barrel for projection lenses on a light entering side and a normalized illuminance in a lower-left corner of a DMD, where the distance between the DMD and the front end of the barrel is a parameter, according to an embodiment of the present invention.

FIG. 16 is a graph illustrating the relation between the front-end diameter of barrel $\varphi$ and illuminance in a lower-left corner of a reflection plane of the DMD 6 (on the +X-axis side and on the −Z-axis side), in the image display apparatus 50, according to the present embodiment. In FIG. 16, the relation is obtained by performing simulation, and the distance H is a parameter. Note that the simulation is preformed using the LightTools (registered trademark) developed by Optical Research Associates (ORA). Note also that the light source used in the simulation is assumed to be a high-pressure mercury-vapor lamp UHP 240-190W, 0.8, E20.9, FusionStar by Philips.

According to the graph of FIG. 16, no reduction in illuminance occurs due to loss when the front-end diameter $\varphi$ of barrel is sufficiently small (for example, $\varphi$<1.3 [mm]) and the distance H is within the range of 15 to 35 [mm]. However, the illuminance decreases as the front-end diameter $\varphi$ of barrel increases.

Figure 17:
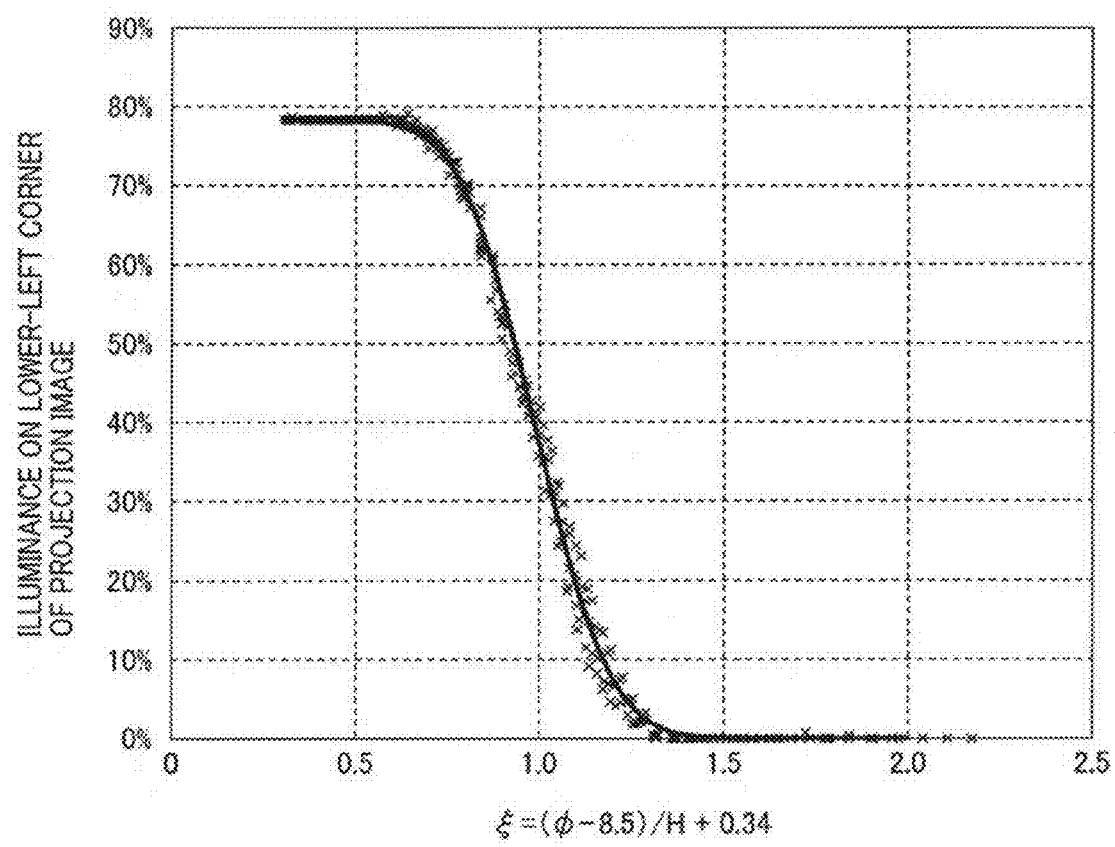
FIG. 17 is a graph illustrating the relation between, the distance between the DMD and the front end of a barrel for projection lenses on a light entering side and the diameter of the barrel, and a normalized illuminance in a lower-left corner of a projection image, according to an embodiment of the present invention.

FIG. 17 is a graph illustrating a normalized illuminance in a lower left corner of a projection image on the projection plane 108, where the horizontal axis of the graph illustrated in FIG. 16 is normalized assuming that $\xi=(\varphi-8.5)/H+0.34$, according to the present embodiment.

A method of normalizing the illuminance at a lower left corner of a projection image is described. The illumination distribution on a projection image is simulated assuming that the transmittance of the flat glass 10 is 100% regardless of the wavelength and the incident angle. The effect of the transmittance of the flat glass 10 is taken into considerations separately.

Next, assuming that the illuminance at the center of a projection image is 100%, the illuminance at each area of the projection image is normalized based on the illumination distribution obtained in the simulation. In the projection optical system 30 of the image display apparatus 50, the illuminance ratio of the center of a projection image to a lower left corner of the projection image is 1:0.922. Accordingly, the normalized illuminance at a lower left corner of a projection image as illustrated in FIG. 17 is approximately obtained by multiplying the normalized illuminance at a lower left corner of a reflection plane of the DMD 6 as illustrated in FIG. 16 by 0.922.

The solid line in FIG. 17 is an approximate curve obtained by the simulation. Assuming that the normalized illuminance at a lower left corner of a projection image on the projection plane 108 is Lth, an approximate curve is expressed in Equation 5 below.

$$L_{th} = H_0 \cdot \text{Erfc}\{m_0 \cdot (\xi + \xi_0)\} \qquad \text{[Equation 5]}$$

$\xi$ in Equation 5 is expressed in Equation 6 below.

$$\xi = \frac{\phi - 8.5}{H} + 0.34 \qquad \text{[Equation 6]}$$

Erfc in Equation 5 is expressed in Equation 7 below.

$$Erfc(x) = \frac{\pi}{\sqrt{2}} \int_x^\infty e^{-t^2} dt \qquad \text{[Equation 7]}$$

H0, m0, and ξ0 in Equation 5 is expressed in Equation 8 below $$H_0 = 0.39185, \ m_0 = 4.4, \ \xi_0 = 0.99 \qquad \text{[Equation 8]}$$

Note also that the right side of Erfc(x) in Equation 7 is a complementary error function.

According to the graph depicted in FIG. 17, Lth becomes 0 when ξ>1.34. The minimum illuminance in the normalized illumination distribution in a projection image becomes equal to or greater than 32.5% (Lth≥32.5%) on conditions that ξ>1.0, i.e., φ<0.71H+8.5, according to FIG. 17 and Equation 6.

In the conditional expressions given above, the influence of the optical transmittance of the flat glass 10 is not taken into consideration. Accordingly, the front-end diameter of barrel φ in the image display apparatus 50 is satisfactory as long as the conditional expressions given above are met regardless of the optical transmittance of the coating applied to the incident plane and the exit plane of the flat glass 10.

Figure 18:
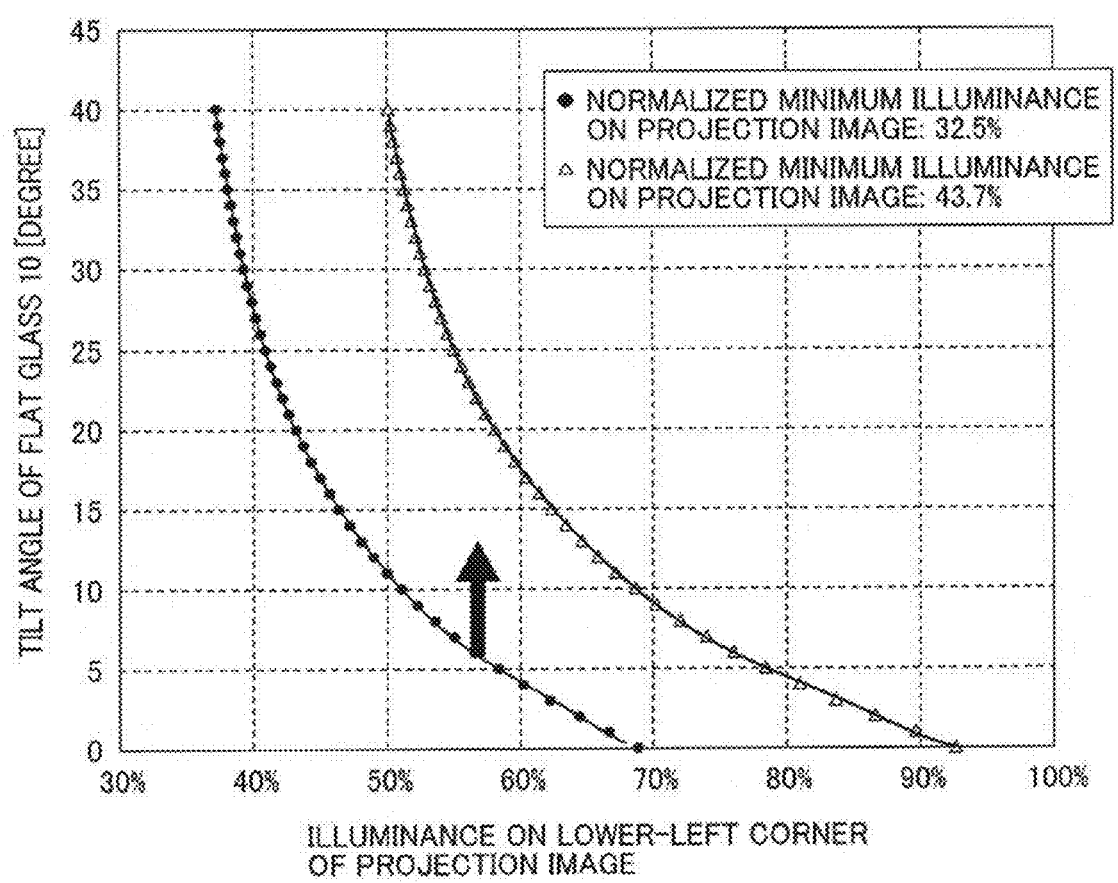
FIG. 18 is a graph illustrating the relation between a normalized illuminance in a lower-left corner of a projection image and the tilt angle of a flat glass, according to an embodiment of the present invention.

FIG. 18 is a graph indicating the calculated relation between normalized illuminance Lth at a lower left corner of a projection image on the projection plane 108 and a tilt angle ang of the flat glass 10 with reference to the xz plane, according to the present embodiment. In FIG. 18, the normalized minimum illuminance on a projection image is set to be a parameter in view of the spectral transmittance of the flat glass 10.

FIG. 18 indicates that in an area indicated above the arrow, the image display apparatus 50 can obtain a normalized minimum illuminance on the respective projection images. For example, in order to satisfy 32.5% for the normalized minimum illuminance on a projection image when Lth is 60%, the tilt angle of the flat glass 10 needs to be equal to or greater than 4 degrees.

When the normalized minimum illuminance on a projection image is 32.5% in FIG. 18, the condition of ang with reference to Lth is approximately expressed as in Equation 9 given below.

$$ang \geq \epsilon_6 L_{th}^6 + \epsilon_5 L_{th}^5 + \epsilon_4 L_{th}^4 + \epsilon_3 L_{th}^3 + \epsilon_2 L_{th}^2 + \epsilon_1 L_{th} + \epsilon_0 \geq 0 \qquad \text{[Equation 9]}$$

Some elements of Equation 9 are expressed in Equation 10 given below.

$$\epsilon_6 = 5.1175865 \times 10^5, \ \epsilon_5 = -1.6977829 \times 10^6,$$
$$\epsilon_4 = 2.3354263 \times 10^6, \ \epsilon_3 = -1.7059824 \times 10^6$$

$$\epsilon_2 = 6.9862716 \times 10^5, \ \epsilon_1 = -1.5235034 \times 10^5,$$
$$\epsilon_0 = 1.3872549 \times 10^4 \qquad \text{[Equation 10]}$$

In Equation 9, it is assumed that ang=0 when ang<0 according to Lth (i.e., when Lth>68.9% in FIG. 18). It is assumed that the direction in which a side of the flat glass 10, i.e., the edge 115 further from the projection plane 108 as illustrated in FIG. 2 and FIG. 3, rotates in the +Y-axis direction is the normal direction of ang.

In the image display apparatus 50 according to the present embodiment, φ=23 [mm], H=31 [mm], and ang=15 [degrees]. In the above configuration, TR*ang<4.5.

Due to the configuration as described above, the image display apparatus 50 with the optical system 100 can achieve the minimum illuminance that is equal to or greater than a desired value on a projection image, and achieve an even illumination distribution that is free from an unevenness of illuminance in a projection image. As the image display apparatus 50 according to the present embodiment can avoid situations where the flat glass 10 excessively tilts, the image display apparatus 50 can be downsized.

When the size ratio of the longer side to the shorter side of the DMD 6 (aspect ratio) is large in a mirror illumination system (so-called very-short focal-point projector) where the second illumination mirror 5 is close to the barrel 15 for projection lenses on a light entering side, the illuminance at a lower left corner of a projection image tends to decrease due to optical loss. As described above, a projection image with an even illumination distribution can be achieved by satisfying the conditional expressions expressed in Equation 5 to Equation 10 in the optical system 100 of the image display apparatus 50.

Figure 19:
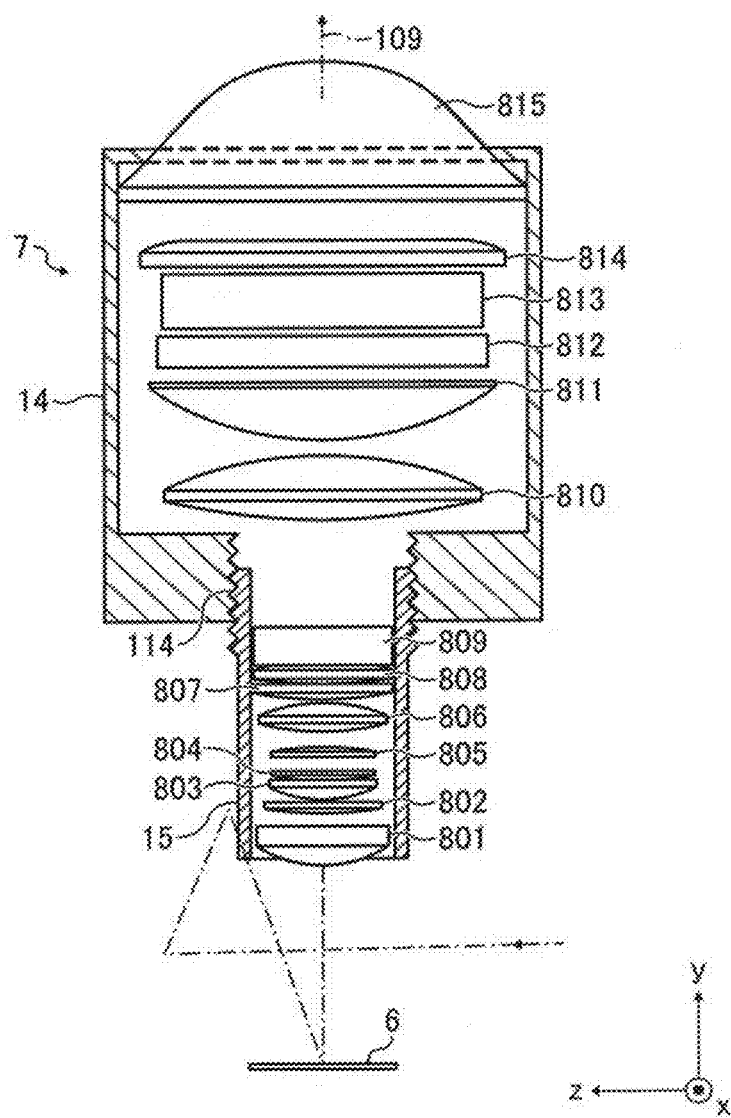
FIG. 19 is a diagram illustrating the optical arrangement of a projection lens system stored inside a barrel, according to an embodiment of the present invention.

FIG. 19 is a sectional view of the joint between the barrel 14 for projection lenses on a light exiting side and the barrel 15 for projection lenses on a light entering side of the projection lens system 7 illustrated in FIG. 8A. As illustrated in FIG. 19, the joint 114 between the barrel 14 for projection lenses on a light exiting side and the barrel 15 for projection lenses on a light entering side is helicoidal. As the joint 114 is helicoidal, the projection lens system 7 can fix the distance between the DMD 6 and the projection lens system 7 after the group of the lens 801 to the lens 809 is adjusted in the optical-axis direction of the projection lenses (Y-axis direction). The joint 114 serves as an adjuster that can adjust the distance between the DMD 6 and the projection lens system 7 with high accuracy. For example, compared with a system where the distance between the projection lens system 7 and the DMD 6 is adjusted using a spacer disposed between the DMD 6 and the projection lens system 7, the distance between the DMD 6 and the projection lens system 7 can continuously be changed when the helicoidal joint 114 according to the present embodiment is used. Accordingly, a high-quality projection image can be obtained due to the joint 114. Further, even when the joint 114 is used as in the present embodiment, an even illumination distribution can be obtained when the conditional expressions as given above are satisfied.

As described above, with the image display apparatus 50 and its optical system 100 according to the present embodiment, a compact image display apparatus with very short focal length can be achieved, and such an image display apparatus can evenly illuminate a projection plane. More specifically, with the image display apparatus 50 and its optical system 100 according to the present embodiment, the minimum illuminance in the illumination distribution on an image projected onto a projection plane can have a value equal to or greater than a desired value of illuminance when $\varphi$, H, and ang are set based on the conditional expressions given above. Accordingly, evenness in illuminance can be achieved on a projection image. In particular, a very-short focal-length image display apparatus in which the second illumination mirror 5 on the DMD 6 side is spherical is suitable.

According to the image display apparatus 50 and its optical system 100, the tilt angle of the flat glass 10 can be made small, and thus the image display apparatus 50 can be downsized.

Furthermore, according to the image display apparatus 50 and its optical system 100, the joint 114 is provided that can adjust the relative positions of the projection lens system 7 on the DMD 6 side towards the optical-axis direction of the projection lenses, and thus a high-quality projection image can be obtained even if the aspect ratio of the longer-side direction and the shorter-side direction is high.

<Image Display Apparatus>

Next, an image display apparatus and an image display unit according to another embodiment of the present invention is described, mainly concerning the differences from the previously-described embodiment.

Table 8 depicts the specification of the parts of an illumination optical system formed between a light source and a DMD, in the image display apparatus according to the present the present embodiment. Note that the coordinates indicating the relative positions of the optical components of the illumination optical system is similar to those of Table 2.

TABLE 8

| | | | |
|---|---|---|---|
| Light Source 1 | Condensing Angle | 59.5 degrees | |
| Light Tunnel 2 | Slot Size | 6.55 × 3.20 mm | |
| | Length | 30 mm | |
| Lens 3 (Front Lens) | Radius of Curvature $r_{LIGHT\ ENTERING\ SIDE}$ | 36.050 mm | Convex Spherical Surface |
| | Radius of Curvature $r_{LIGHT\ EXITING\ SIDE}$ | −9.999 mm | Convex Aspherical Surface |
| | Aspherical Coefficient $C_{04}$ | 1.8195554E−05 | |
| | Aspherical Coefficient $C_{06}$ | 2.5492468E−06 | |
| | Aspherical Coefficient $C_{08}$ | −2.4282315E−09 | |
| | Aspherical Coefficient $C_{10}$ | −1.4518873E−10 | |
| | Aspherical Coefficient $C_{12}$ | 1.5422572E−13 | |
| | Aspherical Coefficient $C_{14}$ | 4.3465304E−14 | |
| | Center Thickness | 6.3 mm | |
| | Glass Material | L-BSL7 | OHARA |
| | Outside Diameter | φ18.5 | |
| Lens 3 (Rear Lens) | Radius of Curvature $r_{LIGHT\ ENTERING\ SIDE}$ | 98.467 mm | Convex Spherical Surface |
| | Radius of Curvature $r_{LIGHT\ EXITING\ SIDE}$ | −14.738 mm | Convex Spherical Surface |
| | Center Thickness | 6.0 mm | |
| | Glass Material | H-K9L | CDGM |
| | Outside Diameter | Φ19.2 | |
| First Illumination Mirror 4 (Planar Mirror) | Radius of Curvature r | ∞ | Plane Reflection Plane: |
| | Thickness | 2.0 mm | Silver Coating |
| Second Illumination Mirror 5 (Toroidal Mirror) | Radius of Curvature $r_x$ | 79.633 | Concave Toroidal Surface |
| | Radius of Curvature $r_y$ | 68.330 | |
| | Thickness | 2.0 | Reflection Plane: Silver Coating |
| | External Dimension | 45.5 × 34 mm | Cutout Portion in Longer-side Direction |
| DMD 6 | Cover Glass: Radius of Curvature r | ∞ | Plane |
| | Thickness of Cover Glass | 1.05 mm | |
| | Cover Glass: Refractive Index nd | 1.5163 | S-BSL7 |
| | Cover Glass: Abbe Number vd | 64.1 | |
| | Number of Pixels (Longer-side Direction) | 1,920 | Pixel Size: 7.06 μm |
| | Number of Pixels (Shorter-side Direction) | 1,080 | |
| | Size (Longer-side Direction) | 14.5152 mm | |

TABLE 8-continued

| | |
|---|---|
| Size (Shorter-side Direction) | 8.1648 mm |
| Pitch of Pixels | 7.56 μm |

The aspherical coefficients of the lens 3 are all zero unless specified in the above table.

As depicted in Table 1 and Table 8, only the differences between the previously-described illumination optical system 20 of the image display apparatus 50 and the illumination optical system of the image display apparatus according to the present embodiment are in the slot size of the light tunnel 2 and the shape of the reflection plane of the second illumination mirror 5.

Figure 20:
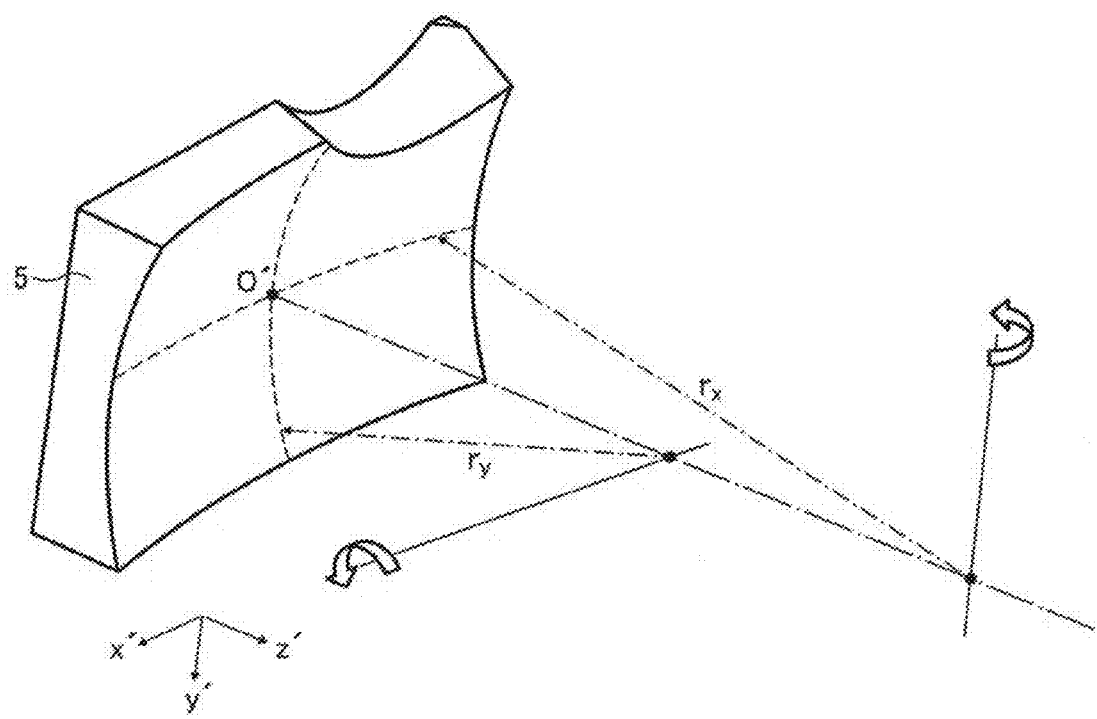
FIG. 20 is a schematic diagram illustrating a toroidal surface of a second illumination mirror in an image display apparatus according to another embodiment of the present invention.

FIG. 20 is a schematic diagram illustrating a toroidal surface of the second illumination mirror 5 in an image display apparatus according to another embodiment of the present invention. As illustrated in FIG. 20, the shape of the reflection plane of the second illumination mirror 5 in the image display apparatus according to the present embodiment is toroidal. Assuming that the origin point of a local coordinate system (x'y'z' system) is O', a toroidal surface is an aspherical surface defined by Equation 11 given below. More specifically, assuming an arch of radius of curvature rx around an axis parallel to the Y'-axis, the toroidal surface is formed by rotating the arc around an axis parallel to the X'-axis.

$$z'(x', y') = \frac{\frac{2(x')^2}{\alpha r_x} - \frac{(x')^4}{\alpha^2 r_x^2 r_y} + \frac{(y')^2}{r_y}}{1 + \sqrt{\left\{1 - \frac{(x')^2}{\alpha r_x r_y}\right\}^2 - \left(\frac{y'}{r_y}\right)^2}},$$ [Equation 11]

$$\alpha = 1 + \sqrt{1 - \left(\frac{x'}{r_x}\right)^2}$$

Also in the image display apparatus according to the present embodiment, the values of φ, H, and ang are determined based on conditional expressions similar to those used for the previously-described image display apparatus 50. For example, φ=23 [mm], H=31 [mm], and ang=15 [degrees]. Accordingly, with the image display apparatus according to the present embodiment, the minimum illuminance on a projection plane can have a value equal to or greater than a desired value even when a front end of the projection lens system is close to the second illumination mirror 5.

Also in the image display apparatus according to the present embodiment, TR<0.3, TR*ang<4.5, and LL/LS≥1.77 in the DMD 6, in a similar manner to the previously-described image display apparatus 50. Moreover, values such as the value of aspect ratio in the DMD 6 or the configuration of the projection lens system are similar to those of the previously-described image display apparatus 50.

As described above, with the image display apparatus according to the present embodiment, a compact image display apparatus with very short focal length can be achieved, and such an image display apparatus can evenly illuminate a projection plane.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image display apparatus comprising:
a light source configured to emit light, the light source including a primary luminous body;
an illumination optical system including a luminous body forming device configured to form a secondary luminous body, the illumination optical system guiding the light emitted from the light source;
an optical modulation element including a plurality of reflection planes to modulate the light guided by the illumination optical system; and
a projection optical system including a projection lens system and a barrel storing the projection lens system, the projection optical system projecting the light modulated by the optical modulation element onto a projection plane, wherein
the barrel satisfies an equation φ<0.71H+8.5,
where φ denotes an outside diameter of a front end of the barrel on a light entering side and H denotes distance between the reflection planes and the front end of the barrel, wherein:
the projection optical system includes a light-transmissive flat plate that is disposed upon being rotated around a rotation axis parallel to a longer-side direction of the reflection planes of the optical modulation element, the light-transmissive flat plate transmitting the light modulated by the optical modulation element, and
regarding the φ and H, ang satisfies $$ang \geq \varepsilon_6 L_{th}^6 + \varepsilon_5 L_{th}^5 + \varepsilon_4 L_{th}^4 + \varepsilon_3 L_{th}^3 + \varepsilon_2 L_{th}^2 + \varepsilon_1 L_{th} + \varepsilon_0 \geq 0$$

$$L_{th} = H_0 \cdot Erfc\{m_0 \cdot (\xi + \xi_0)\}$$

$$\xi = \frac{\phi - 8.5}{H} + 0.34$$

where the ang denotes an angle that the reflection planes form with an incident plane and an exit plane of the light-transmissive flat plate, and $\varepsilon_6 = 5.1175865 \times 10^5$ $\varepsilon_5 = -1.6977829 \times 10^6$ $\varepsilon_4 = 2.3354263 \times 10^6$ $\varepsilon_3 = -1.7059824 \times 10^6$ $\varepsilon_2 = 6.9862716 \times 10^5$ $\varepsilon_1 = -1.5235034 \times 10^5$ $\varepsilon_0 = 1.3872549 \times 10^4$ $$Erfc(x) = \frac{\pi}{\sqrt{2}} \int_x^\infty e^{-t^2} dt$$

$H_0 = 0.39185$ $m_0 = 4.4$ $\xi_0 = 0.99.$

2. The image display apparatus according to claim 1, wherein
the projection optical system further includes a first projector mirror and a second projector mirror,
the projection lens system, the first projector mirror, the second projector mirror, and the light-transmissive flat plate are arranged in that order, in an optical path from the optical modulation element to the projection plane,
the second projector mirror is a concave aspherical mirror, and $TR \cdot ang < 4.5$ where TR denotes a ratio of a width of a projection image on the projection plane to a distance between the projection plane and a point of intersection of the second projector mirror and an optical axis of the projection lens system.

3. The image display apparatus according to claim 2, wherein
the projection optical system satisfies an equation $TR < 0.3.$ 4. The image display apparatus according to claim 1, wherein: the projection lens system further includes an adjuster to adjust a position of a lens group closest to the optical modulation element in an optical-axis direction of the projection lens system.

5. An image display apparatus comprising:
a light source configured to emit light, the light source including a primary luminous body;
an illumination optical system including a luminous body forming device configured to form a secondary luminous body, the illumination optical system guiding the light emitted from the light source;
an optical modulation element including a plurality of reflection planes to modulate the light guided by the illumination optical system; and
a projection optical system including a projection lens system and a barrel storing the projection lens system, the projection optical system projecting the light modulated by the optical modulation element onto a projection plane,
wherein
the barrel satisfies an equation $\varphi < 0.71H + 8.5$,
where $\varphi$ denotes an outside diameter of a front end of the barrel on a light entering side and H denotes distance between the reflection planes and the front end of the barrel,
wherein:
the illumination optical system further includes an illumination lens system and an illumination optical element where a part of the illumination optical element is cut along an external shape of the barrel of the projection optical system, and
the illumination optical element is arranged closest to the optical modulation element in an optical path from the luminous body forming device to the optical modulation element.

6. The image display apparatus according to claim 5, wherein
the illumination optical element is a spherical mirror.

7. The image display apparatus according to claim 5, wherein
the illumination optical element is a toroidal mirror.

8. The image display apparatus according to claim 5, wherein: the projection lens system further includes an adjuster to adjust a position of a lens group closest to the optical modulation element in an optical-axis direction of the projection lens system.

9. An image display apparatus comprising:
a light source configured to emit light, the light source including a primary luminous body;
an illumination optical system including a luminous body forming device configured to form a secondary luminous body, the illumination optical system guiding the light emitted from the light source;
an optical modulation element including a plurality of reflection planes to modulate the light guided by the illumination optical system; and
a projection optical system including a projection lens system and a barrel storing the projection lens system, the projection optical system projecting the light modulated by the optical modulation element onto a projection plane,
wherein
the barrel satisfies an equation $\varphi < 0.71H + 8.5$,
where $\varphi$ denotes an outside diameter of a front end of the barrel on a light entering side and H denotes distance between the reflection planes and the front end of the barrel,
wherein the image display apparatus satisfies $LL/LS \geq 1.77,$ where LL denotes a length of a longer side of the optical modulation element and LS denotes a length of a shorter side of the optical modulation element.

10. The image display apparatus according to claim 9, wherein: the projection lens system further includes an adjuster to adjust a position of a lens group closest to the optical modulation element in an optical-axis direction of the projection lens system.

* * * * *